United States Patent
Si et al.

(10) Patent No.: US 12,081,474 B2
(45) Date of Patent: Sep. 3, 2024

(54) SRS RESOURCE CONFIGURATION METHOD, BWP SWITCHING PROCESSING METHOD, AND RELATED DEVICE

(71) Applicant: VIVO MOBILE COMMUNICATION CO., LTD., Guangdong (CN)

(72) Inventors: Ye Si, Chang'an Dongguan (CN); Peng Sun, Chang'an Dongguan (CN); Huaming Wu, Chang'an Dongguan (CN); Xiaodong Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 362 days.

(21) Appl. No.: 17/513,196

(22) Filed: Oct. 28, 2021

(65) Prior Publication Data
US 2022/0052813 A1  Feb. 17, 2022

Related U.S. Application Data

(63) Continuation of application No. PCT/CN2020/086979, filed on Apr. 26, 2020.

(30) Foreign Application Priority Data

Apr. 30, 2019  (CN) .......................... 201910364205.0

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ... H04L 5/0048; H04L 5/0094; H04L 5/0051; H04L 5/0096; H04W 72/0446; H04W 4/02; H04W 72/0453; H04W 72/23
See application file for complete search history.

(56) References Cited

U.S. PATENT DOCUMENTS

| 2012/0014349 A1* | 1/2012 | Chung | H04W 72/0453 370/329 |
| 2016/0043842 A1 | 2/2016 | Gong et al. | |

(Continued)

FOREIGN PATENT DOCUMENTS

| CN | 107911203 A | 4/2018 |
| CN | 108111279 A | 6/2018 |

(Continued)

OTHER PUBLICATIONS

Nokia et al., "Views on DL and UL reference signals for NR Positioning," 3GPP TSG RAN WG1 #96bis, R1-1905262, (Apr. 8-12, 2019).

(Continued)

*Primary Examiner* — Chae S Lee
(74) *Attorney, Agent, or Firm* — Price Heneveld, LLP

(57) ABSTRACT

An SRS resource configuration method, a BWP switching processing method, and a related device. The SRS resource configuration method includes: sending first configuration information to a terminal, where the first configuration information is used to configure a pattern of a sounding reference signal SRS resource, the SRS resource is distributed at equal intervals in frequency domain, an interval is M subcarriers, and M is an integer greater than 4.

20 Claims, 10 Drawing Sheets

Sounding reference signal

(56) References Cited

U.S. PATENT DOCUMENTS

| | | | |
|---|---|---|---|
| 2019/0097874 A1 | 3/2019 | Zhou et al. | |
| 2019/0215110 A1* | 7/2019 | Yang | H04W 76/27 |
| 2020/0008091 A1* | 1/2020 | Wu | H04W 24/10 |
| 2020/0177353 A1* | 6/2020 | Ding | H04L 5/0094 |
| 2020/0213161 A1 | 7/2020 | Zhang et al. | |
| 2020/0280404 A1* | 9/2020 | Qin | H04L 5/0012 |
| 2022/0209997 A1* | 6/2022 | Manolakos | H04W 72/0446 |
| 2022/0360474 A1* | 11/2022 | Zhang | H04L 5/0092 |

FOREIGN PATENT DOCUMENTS

| | | | |
|---|---|---|---|
| CN | 109561489 | A | 4/2019 |
| WO | 2018137246 | A1 | 8/2018 |
| WO | 2020163597 | A1 | 8/2020 |
| WO | 2020198304 | A1 | 10/2020 |

OTHER PUBLICATIONS

Ericsson., "Offline session1 notes for NR Positioning AI—7.2.10.1 DL and UL Reference Signals for NR Positioning (UL Part)," 3GPP TSG RAN WG1 Meeting #96bis, R1-1905751, pp. 1-13, (Apr. 8-12, 2019).

KR Office Action dated Sep. 14, 2023 as received in Application No. 10-2021-7038973.

CN Office Action in Application No. 201910364205.0 dated Dec. 20, 2021.

"Discussion on SRS design and related aspects" vivo, 3GPP TSG RAN WG1 NR Ad Hoc #3, R1-1715625, Sep. 18, 2017.

"DL and UL Reference Signals Design for NR Positioning" Samsung, 3GPP TSG RAN WG1 #96b, R1-1904394, Apr. 8, 2019.

Written Opinion and International Search Report in Application No. PCT/CN2020/086979 dated Nov. 11, 2021.

European Search Report in Application No. 20799586.1 Dated May 20, 2022.

"Discussion on DL and UL RS for NR positioning" 3GPP TSG RAN WG1 #96bis, vivo, R1-1904107, Apr. 8, 2019.

"DL and UL Reference Signals for NR Positioning" 3GPP TSG RAN WG1 96, Ericsson, R1-1905461, Apr. 8, 2019.

\* cited by examiner

Send first configuration information to a terminal, where the first configuration information is used to configure a pattern of a sounding reference signal SRS resource ⸺ 201

When a terminal switches a BWP, send related information of a first BWP to which the terminal switches to a second network device — 1101

Receive first configuration information sent by a network device, where the first configuration information is used to configure a pattern of a sounding reference signal SRS resource — 1201

SRS RESOURCE CONFIGURATION METHOD, BWP SWITCHING PROCESSING METHOD, AND RELATED DEVICE

CROSS-REFERENCE OF RELATED APPLICATION

This application is a continuation application of International Application No. PCT/CN2020/086979 filed on Apr. 26, 2020, which claims priority to Chinese Patent Application No. 201910364205.0 filed in China on Apr. 30, 2019, which is incorporated herein by reference in its entirety.

TECHNICAL FIELD

The present disclosure relates to the field of communications technologies, and in particular, to an SRS resource configuration method, a bandwidth part (BWP) switching processing method, and a related device.

BACKGROUND

In the 5th-generation (5G) mobile communication, according to different functions of a sounding reference signal (SRS), an SRS may be applied for beam management, codebook-based transmission, non-codebook-based transmission, and antenna switching for sending. A terminal (UE) may obtain a plurality of SRS resource sets through higher-layer signaling. A configuration of each SRS resource set includes purposes, periodical characteristics, and the like of the SRS resource set.

In the 5G mobile communication system, in one slot, an SRS resource may occupy the last 6 symbols, higher-layer signaling may be used to configure that the SRS resource occupies 1/2/4 symbols for transmission, and it is supported that a comb structure in frequency domain is comb-2 and comb-4. According to different sending cycles of an SRS resource, it is supported that the SRS resource is periodically sent, is semi-persistently sent, and is aperiodically triggered. When the SRS resource is aperiodically triggered, higher-layer signaling is used to configure an SRS resource set and a slot shift corresponding to a trigger state of each SRS resource. The shift indicates a slot-level interval between receiving of SRS trigger by the terminal (UE) and actual transmission.

In the related technology, supported frequency domain density of the SRS resource is comb-2 and comb-4. As a result, transmit power of the SRS resource is low.

SUMMARY

According to a first aspect, the embodiments of this disclosure provide an SRS resource configuration method, applied to a network device. The method includes:
  sending first configuration information to a terminal, where the first configuration information is used to configure a pattern of a sounding reference signal SRS resource, the SRS resource is distributed at equal intervals in frequency domain, an interval is M subcarriers, and M is an integer greater than 4.

According to a second aspect, the embodiments of the present disclosure further provide a bandwidth part BWP switching processing method, applied to a first network device, where the first network device is a network device that currently serves a terminal. The method includes: when the terminal switches a BWP, sending related information of a first BWP to which the terminal switches to a second network device, where the second network device includes a network device of network devices that participate in positioning of the terminal other than the first network device, the first BWP is used by the terminal to send a first object, and the first object includes an uplink positioning reference signal or an uplink positioning resource.

According to a third aspect, the embodiments of this disclosure further provide an SRS resource configuration method, applied to a terminal side. The method includes:
  receiving first configuration information sent by a network device, where the first configuration information is used to configure a pattern of a sounding reference signal SRS resource, the SRS resource is distributed at equal intervals in frequency domain, an interval is M subcarriers, and M is an integer greater than 4.

According to a fourth aspect, the embodiments of the present disclosure further provide a bandwidth part BWP switching processing method, applied to a location server. The method includes:
  when a terminal switches a BWP, receiving related information of a first BWP that is sent by a first network device, where the first BWP is a BWP to which the terminal switches, the first BWP is used by the terminal to send a first object, and the first object includes an uplink positioning reference signal or an uplink positioning resource; and
  sending the related information of the first BWP to a second network device, where the second network device includes a network device of network devices that participate in positioning of the terminal other than the first network device.

According to a fifth aspect, the embodiments of this disclosure further provide an SRS resource configuration method, applied to a terminal side. The method includes:
  receiving fourth configuration information sent by a network device, where the fourth configuration information is used to configure the terminal to send a first object on a first BWP, the first BWP is an uplink bandwidth part (UL BWP) dedicated for positioning, and the first object includes an uplink positioning reference signal or an uplink positioning resource.

According to a sixth aspect, the embodiments of the present disclosure further provide a network device, including:
  a first sending module, configured to send first configuration information to a terminal, where the first configuration information is used to configure a pattern of a sounding reference signal SRS resource, the SRS resource is distributed at equal intervals in frequency domain, an interval is M subcarriers, and M is an integer greater than 4.

According to a seventh aspect, the embodiments of the present disclosure further provide a network device, where the network device is a first network device that currently serves a terminal, and includes:
  a second sending module, configured to: when the terminal switches a BWP, send related information of a first BWP to which the terminal switches to a second network device, where the second network device includes a network device of network devices that participate in positioning of the terminal other than the first network device, the first BWP is used by the terminal to send a first object, and the first object includes an uplink positioning reference signal or an uplink positioning resource.

According to an eighth aspect, the embodiments of the present disclosure further provide a terminal, including:

a first receiving module, configured to receive first configuration information sent by a network device, where the first configuration information is used to configure a pattern of a sounding reference signal SRS resource, the SRS resource is distributed at equal intervals in frequency domain, an interval is M subcarriers, and M is an integer greater than 4.

According to a ninth aspect, the embodiments of the present disclosure further provide a location server, including:

a second receiving module, configured to: when a terminal switches a BWP, receive related information of a first BWP that is sent by a first network device, where the first BWP is a BWP to which the terminal switches, the first BWP is used by the terminal to send a first object, and the first object includes an uplink positioning reference signal or an uplink positioning resource; and a third sending module, configured to send the related information of the first BWP to a second network device, where the second network device includes a network device of network devices that participate in positioning of the terminal other than the first network device.

According to a tenth aspect, the embodiments of the present disclosure further provide a terminal, including:

a third receiving module, configured to receive fourth configuration information sent by a network device, where the fourth configuration information is used to configure the terminal to send a first object on a first BWP, the first BWP is an uplink bandwidth part UL BWP dedicated for positioning, and the first object includes an uplink positioning reference signal or an uplink positioning resource.

According to an eleventh aspect, the embodiments of the present disclosure further provide a network device, including: a memory, a processor, and a program stored in the memory and executable on the processor. When the program is executed by the processor, steps of the foregoing SRS resource configuration method are performed, or when the program is executed by the processor, steps of the foregoing bandwidth part BWP switching processing method are performed.

According to a twelfth aspect, the embodiments of the present disclosure further provide a terminal, including: a memory, a processor, and a program stored in the memory and executable on the processor. When the program is executed by the processor, steps of the foregoing SRS resource configuration method are performed.

According to a thirteenth aspect, the embodiments of the present disclosure further provide a location server, including: a memory, a processor, and a program stored in the memory and executable on the processor. When the program is executed by the processor, steps of the foregoing bandwidth part BWP switching processing method are performed.

According to a fourteenth aspect, the embodiments of the present disclosure further provide a computer-readable storage medium. The computer-readable storage medium stores a computer program. When the computer program is executed by a processor, steps of the foregoing SRS resource configuration method are performed, or when the computer program is executed by the processor, steps of the foregoing bandwidth part BWP switching processing method are performed.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more preferred or having more advantages than another embodiment or design scheme. To be precise, the use of the term such as "exemplary" or "for example" is intended to present a related concept in a specific manner.

The embodiments of the present disclosure are described below with reference to the accompanying drawings. The embodiments of the present disclosure provide an SRS resource configuration method, a BWP switching processing method, a network device, a terminal, and a location server. The network device, the terminal, and the location server can be applied to a wireless communication system. The wireless communications system may be a 5G system, an evolved long term evolution (eLTE) system, or a subsequent evolved communications system.

Figures 1, 2:
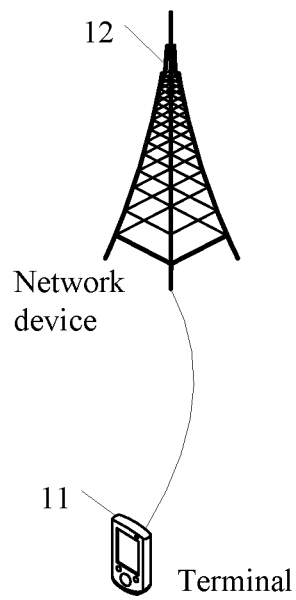
FIG. 1 is a structural diagram of a network system applicable to an embodiment of the present disclosure.
FIG. 2 is a flowchart 1 of an SRS resource configuration method according to an embodiment of the present disclosure.

FIG. 1 is a structural diagram of a network system that can be applied to an embodiment of the present disclosure. As shown in FIG. 1, the network system includes: a terminal 11 and a network device 12. The terminal 11 may be a user terminal or other terminal side devices, for example, a mobile phone, a tablet personal computer, a laptop computer, a personal digital assistant (personal digital assistant, PDA), a mobile internet device (MID), or a wearable device. It should be noted that a specific type of the terminal 11 is not limited in the embodiments of the present disclosure. The network device 12 may be a base station in 5G or later releases, or a base station in other communications systems, or is referred to as a Node B, an evolved Node B, a transmission reception point (TRP), an access point (AP), or other words in the field, as long as the same technical effect is achieved. The network device is not limited to specific technical words. In addition, the network device 12 may be a master node (MN) or a secondary node (SN). It should be noted that in embodiments of the present disclosure, only the 5G base station is used as an example, but a specific type of the network device is not limited.

FIG. 2 is a flowchart of an SRS resource configuration method according to an embodiment of the present disclosure. The method is applied to a network device. As shown in FIG. 2, the method includes the following step:

Step 201: Send first configuration information to a terminal, where the first configuration information is used to configure a pattern of a sounding reference signal SRS resource, the SRS resource is distributed at equal intervals in frequency domain, an interval is M subcarriers, and M is an integer greater than 4.

In the embodiments of the present disclosure, a value of M may be set according to actual needs. For example, in an optional embodiment, M may be 6, 8, or 12. Optionally, a comb structure corresponding to M subcarriers distributed at equal intervals in frequency domain is comb-M. That is, when M is 6, 8, or 12, the corresponding comb structure is com-6, com-8, or com-12.

It should be understood that in addition to pattern information of the SRS resource, the first configuration information may further include configuration information associated with sending of the SRS resource, for example, bandwidth information of the SRS resource, power control information of the SRS resource, time domain configuration information of the SRS resource, beam configuration information of the SRS resource, and sequence configuration information of the SRS resource.

In the embodiments of the present disclosure, the SRS resource is distributed at equal intervals in frequency domain, and the number of interval subcarriers is greater than 4. Compared with the related art in which frequency domain density of the SRS resource is comb-2 and comb-4, in the embodiments of the present disclosure, the SRS resource is distributed at equal intervals in frequency domain, thereby increasing transmit power of the SRS resource.

It should be noted that when M is different values, corresponding patterns of the SRS resource may be different. For example, in an optional embodiment, when M is 8, the pattern of the SRS resource includes two consecutive resource blocks (RB). In another optional embodiment, when M is 6 or 12, the pattern of the SRS resource includes one RB.

That the pattern of the SRS resource includes two consecutive RBs can be understood as: when time-frequency resource mapping is performed for the SRS resource, a resource element (RE) location of an odd-numbered RB in one slot is the same as an odd-numbered RB of the pattern of the SRS resource, and an RE location of any even-numbered RB in one slot is the same as an even-numbered RB of the pattern of the SRS resource. In other words, two consecutive RBs may form an RB bundle, which is the smallest unit during time-frequency resource mapping for the SRS resource. An RE location of the SRS resource within an entire SRS bandwidth range is repeatedly obtained in frequency domain based on this RB bundle.

In the embodiments of the present disclosure, the first configuration information may be further used to configure a frequency domain shift of a comb structure of the SRS resource, that is, a comb offset. Further, in an optional embodiment, the frequency domain shift of the comb structure of the SRS resource, that is, the comb offset may be configured by the network device or specified by the protocol.

When M is 8, the comb offset is used to indicate the lowest RE location of the last symbol of the SRS resource in a first RB.

When M is 6 or 12, the comb offset is used to indicate the lowest RE location of the last symbol of the SRS resource in an RB.

The location of the first RB may be set according to actual conditions. Optionally, the first RB may be any odd-numbered RB or even-numbered RB in the SRS resource. In the embodiments of the present disclosure, whether the first RB is an odd-numbered RB or an even-numbered RB may be specified by the protocol, or may be indicated by the network device, or may be selected by the terminal. When this is indicated by the network device, 1 bit may be used to indicate whether the current lowest RE is on an odd-numbered RB or an even-numbered RB.

In the embodiments of the present disclosure, the comb offset is a natural number less than M. For example, when M is 6, the comb offset is a natural number less than 6; when M is 8, the comb offset is a natural number less than 8; and when M is 12, the comb offset is a natural number less than 12. Optionally, for example, M=8. When the comb offset is i, i is a natural number less than 8, indicating that the lowest RE location of the last symbol of the SRS resource in the RB is the $(i+1)^{th}$ RE from the last. When the comb offset is 0, the corresponding lowest RE location of the last symbol of the SRS resource in the RB is the last RE, as specifically shown in FIG. 3 and FIG. 4.

Further, in the embodiments of the present disclosure, the SRS resource occupies consecutive N symbols; where
when M=6, N is 1, 2, 4, 6, or an integer greater than 6;
when M=8, N is 1, 2, 4, 8, or an integer greater than 8; and
when M=12, N is 1, 2, 4, 6, 8, 12, or an integer greater than 12.

Optionally, the consecutive N symbols occupied by the SRS resource may be the first N symbols, or the last N symbols, or N symbols at any middle locations in a slot. The N symbols of the SRS resource cannot exceed the boundary of the slot.

Further, the first configuration information may be further used to configure a cyclic shift value of the SRS resource. Optionally, when the comb structure is comb-6, the cyclic shift value of the SRS resource may be a natural number less than 8; when the comb structure is comb-8, the cyclic shift value of the SRS resource may be a natural number less than 6; and when the comb structure is comb-12, the cyclic shift value of the SRS resource may be a natural number less than 4.

Further, the first configuration information may be further used to configure a repetition factor of the SRS resource. Optionally, when the comb structure is comb-6, the repetition factor is 1, 2, 4, or 6; when the comb structure is comb-8, the repetition factor is 1, 2, 4, or 8; and when the comb structure is comb-12, the repetition factor is 1, 2, 4, 6, or 12.

It should be understood that in the embodiments of the present disclosure, an RE shift may be further set, and the RE shift may be indicated by the network device or specified by the protocol. For example, in an optional embodiment, when the RE shift is indicated by the network device, the RE shift may be indicated by the first configuration information.

In the embodiments of the present disclosure, the RE shift is used to calculate a frequency domain location of the SRS resource, and in a case that the frequency domain location of the SRS resource calculated according to the RE shift exceeds a preset frequency domain range, the frequency domain location of the SRS resource is: a location obtained after a modulo operation is performed on the frequency domain location according to a specific value.

The frequency domain location of the SRS resource may be understood as: the RE location of the SRS resource on an orthogonal frequency division multiplex (OFDM) symbol.

When M is 6 or 12, the preset frequency domain range is 1 RB, and the specific value is 12; and
when M is 8, the preset frequency domain range is 2 RBs, and the specific value is 24.

Optionally, the frequency domain location of the SRS resource is: a frequency domain location mod a specific value. For example, the comb structure is comb-8, and the following description is provided:

The RE shift is an RE-level shift between adjacent symbols of the SRS resource. An RE frequency domain location of a former symbol may be obtained based on an RE frequency domain location of a latter adjacent symbol and a configured RE shift. When an RE of a symbol on an odd-numbered RB or an even-numbered RB exceeds the range of two consecutive RBs after calculation based on the RE shift, a modulo operation (mod 24) may be performed so that an RE frequency domain location may fall within the range of the consecutive 2 RBs. The RE shift may be a positive or negative offset. For comb-8, the RE shift may be 1, 2, or 4. For example, when the RE shift is 1, the number of symbols of the SRS resource is 8, and the comb structure is comb-8, the corresponding pattern of the SRS resource may be shown in FIG. 3.

Further, when the RE shift is not configured, the terminal should assume that REs of all symbols of the SRS resource have the same positions in frequency domain. For example, when the number of symbols of the SRS resource is 4, and the comb structure is comb-8, the corresponding pattern of the SRS resource may be shown in FIG. 4.

It should be noted that the function of the SRS resource may be set according to actual needs. For example, in the embodiments, the SRS resource may be used for positioning.

In an optional embodiment, when a number N of symbols occupied by the SRS resource is greater than M, a frequency domain location of the $(M+Y)^{th}$ symbol from the last of the SRS resource is the same as a frequency domain location of the $Y^{th}$ symbol from the last, M+Y is less than or equal to N, and Y is a positive integer.

Further, a value of the frequency domain location of the $(M+Y)^{th}$ symbol from the last of the SRS resource is the same as a value of the frequency domain location of the $Y^{th}$ symbol from the last.

Figure 5:
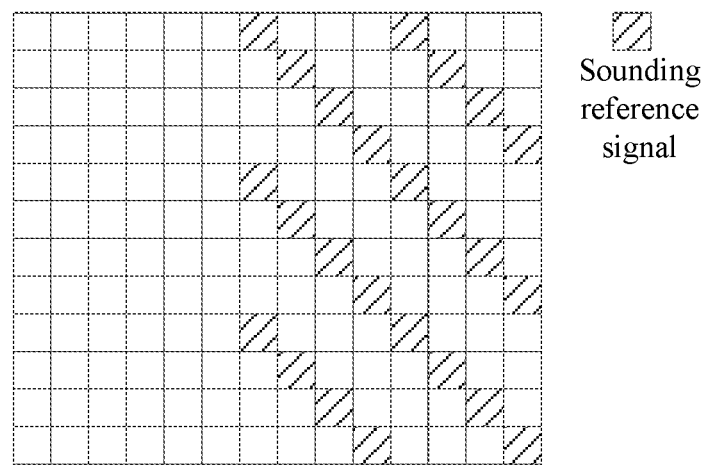
FIG. 5 is a diagram 3 of an example of a pattern of an SRS resource in an SRS resource configuration method according to an embodiment of the present disclosure.

In the embodiments of the present disclosure, the SRS resource may be the repetition of an SRS of the last X symbols. When the SRS resource is used for positioning, no matter how the comb structure of the SRS resource is configured, the number N of symbols of the SRS resource may be greater than a comb size X of the SRS. When the number N of symbols of the SRS resource is greater than the comb size X of the SRS, a frequency domain location (an RE position) of the $(X+Y)^{th}$ symbol from the last of the SRS resource may be the same as a frequency domain location (an RE position) of the $Y^{th}$ symbol from the last, where X+Y≤N. A value of the frequency domain location (an RE position) of the $(X+Y)^{th}$ symbol from the last of the SRS resource may also be the same as a value of the frequency domain location (an RE position) of the $Y^{th}$ symbol from the last. Specifically, refer to the pattern of the SRS resource shown in FIG. 5 to FIG. 10:

In FIG. 5, the comb structure is comb-4, and the number of symbols occupied by the SRS resource is 8.

Figure 6:
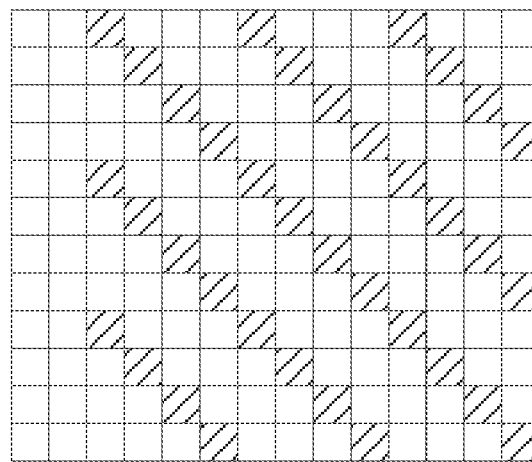
FIG. 6 is a diagram 4 of an example of a pattern of an SRS resource in an SRS resource configuration method according to an embodiment of the present disclosure.

In FIG. 6, the comb structure is comb-4, and the number of symbols occupied by the SRS resource is 12.

Figure 7:
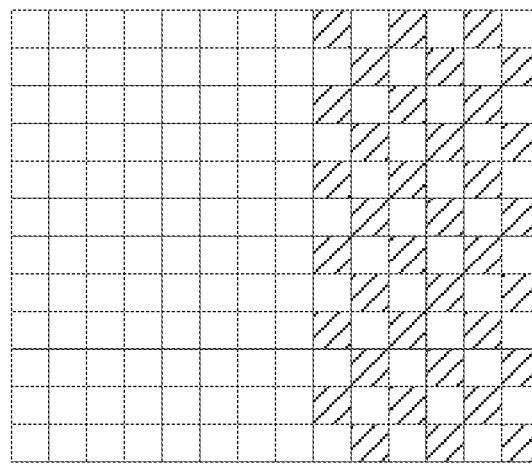
FIG. 7 is a diagram 5 of an example of a pattern of an SRS resource in an SRS resource configuration method according to an embodiment of the present disclosure.

In FIG. 7, the comb structure is comb-2, and the number of symbols occupied by the SRS resource is 6.

Figure 8:
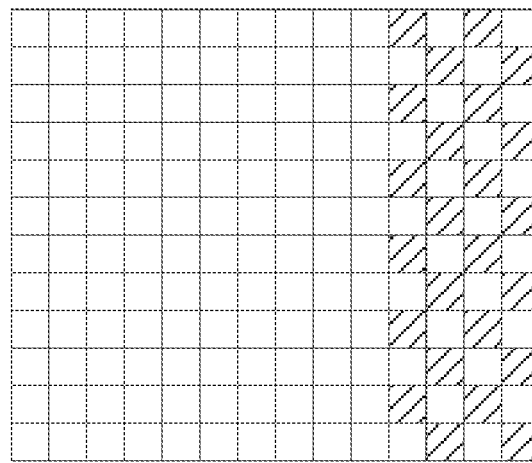
FIG. 8 is a diagram 6 of an example of a pattern of an SRS resource in an SRS resource configuration method according to an embodiment of the present disclosure.

In FIG. 8, the comb structure is comb-2, and the number of symbols occupied by the SRS resource is 4.

Figure 9:
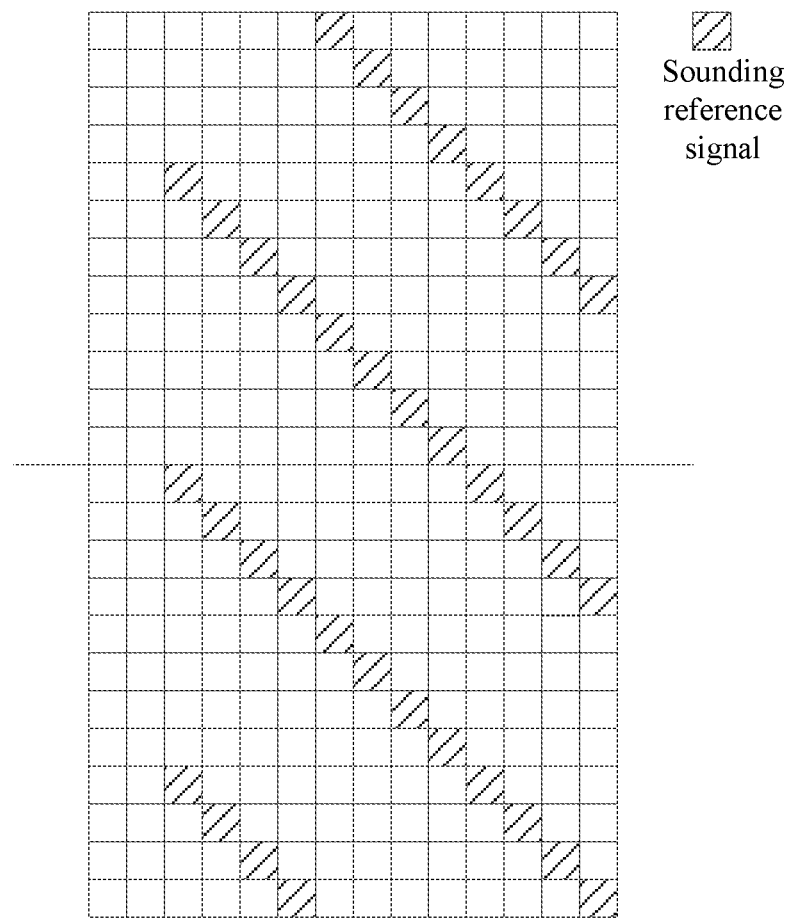
FIG. 9 is a diagram 7 of an example of a pattern of an SRS resource in an SRS resource configuration method according to an embodiment of the present disclosure.

In FIG. 9, the comb structure is comb-8, and the number of symbols occupied by the SRS resource is 12.

Figures 10, 11, 12:
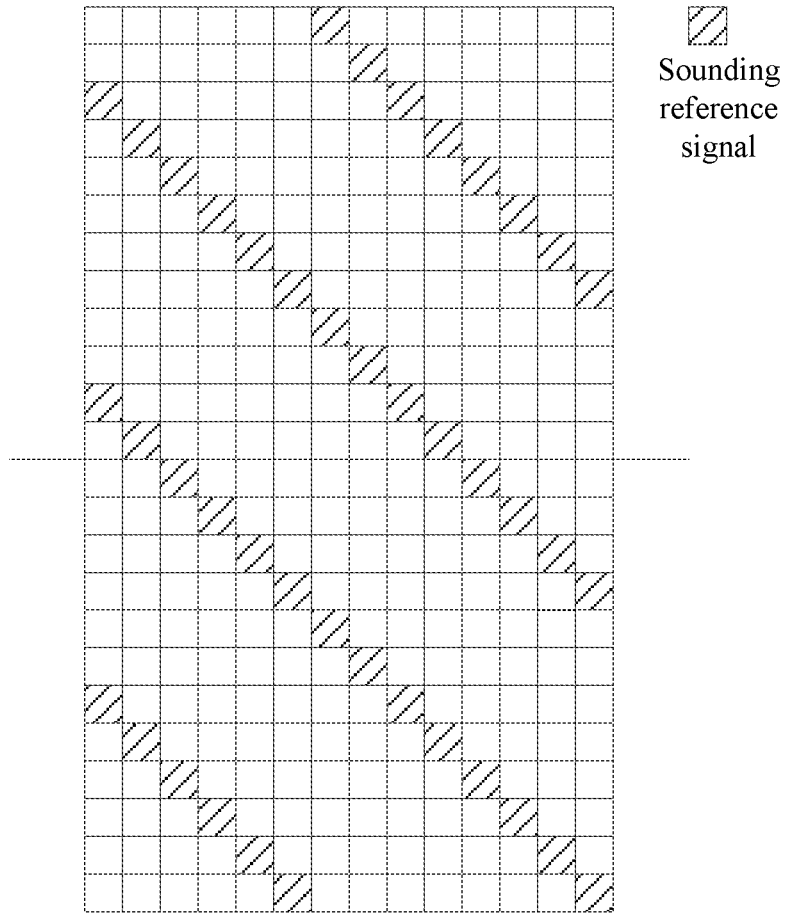
FIG. 10 is a diagram 8 of an example of a pattern of an SRS resource in an SRS resource configuration method according to an embodiment of the present disclosure.
FIG. 11 is a flowchart 1 of a BWP switching processing method according to an embodiment of the present disclosure.
FIG. 12 is a flowchart 2 of an SRS resource configuration method according to an embodiment of the present disclosure.

In FIG. 10, the comb structure is comb-8, and the number of symbols occupied by the SRS resource is 14.

Further, based on the above embodiments, in the embodiments of the present disclosure, the method may further include:

sending first indication information to the terminal, where the first indication information is used to indicate bandwidth information of the SRS resource.

In the embodiments of the present disclosure, the first indication information may be carried in the first configuration information for transmission, or may be carried in another piece of configuration information for transmission. When being sent through another piece of configuration information, the first indication information may be sent before or after the first configuration information is sent, and there is no further restriction herein.

The bandwidth information of the SRS resource may include related bandwidth information of a wideband SRS or a narrowband SRS.

It should be noted that some specific behaviors of the terminal may be defined for some scenarios. For example, in a case that the first configuration information satisfies a first preset condition, the first configuration information is further used to instruct the terminal to perform a preset operation; where the first preset condition includes any one of the following:

M=6, the bandwidth information of the SRS resource is 8 RBs, 16 RBs, or 32 RBs; and M=12, the bandwidth information of the SRS resource is 4 RBs, 8 RBs, 16 RBs, 20 RBs, 28 RBs, or 32 RBs.

The preset operation may include: skipping sending the SRS resource; or truncating a generated sequence of the SRS resource and sending a truncated sequence.

It should be understood that some specific behaviors of the terminal may be further specified by the protocol or selected by the terminal. The following is detailed descriptions of different cases of the comb structure:

Case 1: If the network device configures the comb structure of the SRS resource to be comb-12, and a bandwidth of a broadband SRS or a narrowband SRS is configured to 4 RBs, 8 RBs, 16 RBs, 20 RBs, 28 RBs, or 32 RBs, the terminal does not send the SRS resource. Correspondingly, the network device does not receive the SRS resource. Alternatively, if the network device configures the comb structure of the SRS resource to be comb-12, and the bandwidth of the broadband SRS or the narrowband SRS is configured to 4 RBs, 8 RBs, 16 RBs, 20 RBs, 28 RBs, or 32 RBs, the terminal needs to truncate a generated sequence (a low peak to average power ratio sequence (Low-PAPR sequence) or a ZC sequence) of the SRS resource and then send the truncated sequence. Truncating may be understood as that the terminal obtains a segment from a sequence of a specific length (a low-PAPR sequence or a ZC sequence), or the terminal obtains a subset of a sequence of a specific length.

Correspondingly, the network device receives the SRS resource. A behavior of the terminal may be indicated by the network device, specified by the protocol, or selected by the terminal.

Case 2: If the network device configures the comb structure of the SRS resource to be comb-6, and a bandwidth of a broadband SRS or a narrowband SRS is configured to 8 RBs, 16 RBs, or 32 RBs, the UE does not send the SRS. Correspondingly, the network device does not receive the SRS. Alternatively, if the network device configures the comb structure of the SRS resource to be comb-6, and the bandwidth of the broadband SRS or the narrowband SRS is configured to 8 RBs, 16 RBs, or 32 RBs, the UE needs to truncate a generated sequence (a low-PAPR sequence or a ZC sequence) of the SRS resource and then send the truncated sequence. Correspondingly, the network device receives the SRS resource. A behavior of the terminal may be indicated by the network device, specified by the protocol, or selected by the terminal.

It should be understood that in other embodiments, if the network device configures the comb structure of the SRS resource to be comb3, and a bandwidth of a broadband SRS or a narrowband SRS is configured to 16 RBs or 32 RBs, the UE does not send the SRS. Correspondingly, the network device does not receive the SRS. Alternatively, if the network device configures the comb structure of the SRS resource to be comb-3, and the bandwidth of the broadband SRS or the narrowband SRS is configured to 16 RBs or 32 RBs, the UE needs to truncate a generated sequence (a low-PAPR sequence or a ZC sequence) of the SRS and then send the truncated sequence. Correspondingly, the network device receives the SRS resource. A behavior of the terminal may be indicated by the network device, specified by the protocol, or selected by the terminal.

Further, when performing bandwidth-related configuration of the SRS resource, any one of the following methods may be used.

In a first implementation: the network device may send second configuration information to the terminal, where the second configuration information is used to configure the terminal to send the SRS resource in an uplink active bandwidth part UL active BWP. In this case, the terminal may send the SRS resource in a UL active BWP according to second configuration information.

In a second implementation: the network device may send third configuration information to the terminal, where the third configuration information is configuration information of the first BWP, the third configuration information is used to configure the terminal to send the SRS resource on the first BWP, and the first BWP is an uplink bandwidth part UL BWP dedicated for positioning. In this case, the terminal may send the SRS resource on a first BWP according to third configuration information.

In a third implementation, the first configuration information is not associated with an uplink bandwidth part UL BWP configuration of the terminal. In other words, UL BWP configuration information may not include configuration information of the SRS resource. The configuration information of the SRS resource may also not include UL BWP configuration information. The SRS resource may be configured based on a cell.

In the third implementation, since the first configuration information is not associated with the UL BWP configuration, when the SRS resource is used for positioning, the sending of the SRS resource is not restricted by the BWP, to avoid that a bandwidth of SRS sending restricts positioning accuracy.

Optionally, in the third implementation 3, a behavior that the first configuration information is not associated with the uplink bandwidth part UL BWP configuration of the terminal may be specified by the protocol, configured by a network device, or selected by the terminal. When this is configured by the network device, the above method may further include:

sending second indication information to the terminal, where the second indication information is used to indicate that the first configuration information is not associated with the UL BWP configuration.

The second indication information may be carried in the first configuration information for transmission, or may be carried in another piece of configuration information for transmission. When being sent through another piece of configuration information, the second indication information may be sent before or after the first configuration information is sent, and there is no further restriction herein.

It should be noted that the first configuration information is not associated with the UL BWP configuration includes: bandwidth information and baseband parameter numerology of the SRS resource are not associated with the UL BWP configuration.

Further, the maximum bandwidth of the SRS resource is related to UE capabilities. Optionally, in this embodiment, the method may further include:

receiving capability information sent by the terminal, where the capability information includes a maximum uplink transmission bandwidth that the UE can support; and determining a frequency domain range of the SRS resource according to the maximum uplink transmission bandwidth.

In the embodiments of the present disclosure, after a frequency domain range of the SRS resource is determined, the frequency domain range of the SRS resource may be sent to the terminal. Optionally, the frequency domain range of the SRS resource may be sent through the first configuration information, or may be sent through other configuration information.

Further, switching of the UL BWP is not associated with sending of the SRS resource by the terminal. That is, when the SRS resource is not associated with the UL BWP, a behavior of switching the UL BWP does not affect sending of the SRS resource by the terminal.

Alternatively, even if the configuration of the SRS resource is not associated with the UL BWP configuration, the terminal may stop sending the SRS when the UL BWP is switched.

Further, the frequency domain range of the SRS resource may fall within the UL BWP configuration, or may not fall within the UL BWP configuration. It should be understood that the terminal may be configured with a maximum of 4 UL BWPs, and the frequency domain range of the SRS resource within the UL BWP configuration means that the frequency domain range of the SRS resource does not exceed a frequency domain range occupied by all multiple UL BWPs configured for the terminal.

It should be noted that an uplink resource used for positioning may not be limited to the SRS, and may also be other uplink positioning reference signals or uplink positioning resources. In the embodiments of the present disclosure, sending of the SRS resource is not associated with a UL BWP configuration. In other embodiments, in the behavior of the terminal, the uplink positioning reference signal or the uplink positioning resource used for positioning is not associated with the UL BWP configuration.

For example, the behavior of the terminal may include:

receiving target configuration information sent by the network device, where the target configuration information is used to configure a first object, the first object includes an uplink positioning reference signal or an uplink positioning resource used for positioning, and the target configuration information is not associated with the UL BWP configuration.

Further, the first configuration information is not associated with the UL BWP configuration includes: bandwidth information and baseband parameter numerology of the SRS resource are not associated with the UL BWP configuration.

Further, that the target configuration information is not associated with the UL BWP configuration may be specified by the protocol, configured by the network device, or selected by the terminal.

Further, the frequency domain range of the first object falls within the UL BWP configuration, or the frequency domain range of the first object does not fall within the UL BWP configuration.

In the related art, during uplink positioning, multiple target objects need to receive SRS resources sent by the UE. When the UE switches the BWP, in the related technology, a neighboring cell cannot obtain information of BWP switching, and thus cannot correctly receive the SRS resource after BWP switching. The target object is a TRP, a cell, or a base station (BS). Referring to FIG. 11, to ensure that a neighboring cell participating in positioning can obtain information of BWP switching, the embodiments of the present disclosure further provide a bandwidth part BWP switching processing method, applied to a first network device, where the first network device is a network device that currently serves a terminal, and the method includes:

Step 1101: When the terminal switches a BWP, send related information of a first BWP to which the terminal switches to a second network device, where the second network device includes a network device of network devices that participate in positioning of the terminal other than the first network device, the first BWP is used by the terminal to send a first object, and the first object includes an uplink positioning reference signal or an uplink positioning resource.

In the embodiments of the present disclosure, that the terminal performs the BWP switching specifically is that the terminal performs the UL BWP switching, and the first network device may be a base station (gNB) or a cell that currently serves the terminal, that is, a serving gNB or a serving cell. In an optional embodiment, the first object is a sounding reference signal SRS resource, and a comb structure design of the SRS resource may specifically be the design of comb-2 or comb-4 in the related technology, or may be the design of comb-6, comb-8, or comb-12 provided in the embodiments of the present disclosure. For the specific design of comb-6, comb-8, or comb-12, refer to the above embodiments, and details are not repeated herein.

It should be understood that during sending of the related information of the first BWP to the second network device, in an optional embodiment, the related information of the first BWP may be sent directly to the second network device. Optionally, the sending related information of a first BWP to which the terminal switches to a second network device includes:

directly sending the related information of the first BWP to the second network device through an Xn interface.

Alternatively, in an optional embodiment, the related information of the first BWP may be sent to the second network device indirectly. Optionally, the sending related information of a first BWP to which the terminal switches to a second network device includes:

sending the related information of the first BWP to a location server, so that the location server forwards the related information of the first BWP to the second network device.

In the embodiments of the present disclosure, when the terminal switches the UL BWP, the first network device sends the related information of the first BWP to which the terminal switches to the second network device. In this way, it can be ensured that each second network device used for positioning can obtain the related information of the first BWP to which the terminal switches. Therefore, the embodiments of the present disclosure can ensure that each network device participating in positioning can correctly receive the first object sent by the terminal on the first BWP to which the terminal switches, thereby improving positioning reliability.

Further, the related information of the first BWP includes time domain configuration information of the first BWP, a configuration of the first BWP, or identifier information of the first BWP.

Further, the first BWP configuration information may include configuration information of the first object.

Further, during uplink positioning, the first network device may send all UL BWP configuration information associated with the terminal to the location server, so that the location server can forward all the UL BWP configuration information to the second network device. The location server may send all the UL BWP configuration information associated with the terminal to the second network device. When the terminal switches an UL BWP, the related information of the first BWP may only include time-domain configuration information of the first BWP and identifier information of the first BWP. The second network device only needs to obtain the identifier information of the first BWP to select the configuration information of the first BWP from all stored UL BWP configurations associated with the terminal, to receive the first object sent on the first BWP after BWP switching.

In an optional embodiment, before the sending related information of a first BWP to which the terminal switches to a second network device, the method further includes:
  sending second configuration information to the terminal, where the second configuration information is used to configure the terminal to send the first object in an uplink active bandwidth part UL active BWP.

In this embodiment, the network device may instruct the terminal to switch the BWP. In this case, the first BWP may be a new UL BWP that the network device instructs to activate. After the terminal switches from the current UL active BWP to the first BWP, the terminal sends the first object on the first BWP.

In another optional embodiment, before the sending related information of a first BWP to which the terminal switches to a target network device, the method further includes:
  sending third configuration information to the terminal, where the third configuration information is configuration information of the first BWP, the third configuration information is used to configure the terminal to send the first object on the first BWP, and the first BWP is an uplink bandwidth part UL BWP dedicated for positioning.

In the embodiments of the present disclosure, the configuration information of the first BWP includes at least one of identifier information of the first BWP, baseband parameter numerology information of the first BWP, bandwidth information of the first BWP, frequency domain location information of the first BWP, and configuration information of the first object.

Further, in a case that a second preset condition is not satisfied, sending third indication information to the terminal, where the third indication information is used to instruct the terminal to perform BWP switching;
  where the second preset condition includes: the first BWP is included in a BWP currently activated by the terminal, and a baseband parameter of the first BWP is the same as a baseband parameter of the BWP currently activated by the terminal.

In the embodiments of the present disclosure, the third indication information may be carried in the third configuration information for transmission, or may be carried in another piece of configuration information for transmission. When being sent through another piece of configuration information, the third indication information may be sent before or after the third configuration information is sent, and there is no further restriction herein.

It should be noted that in an optional embodiment, the first object is a sounding reference signal SRS resource, and a comb structure design of the SRS resource may specifically be the design of comb-2 or comb-4 in the related technology, or may be the design of comb-6, comb-8, or comb-12 provided in the embodiments of the present disclosure. For the specific design of comb-6, comb-8, or comb-12, refer to the above embodiments, and details are not repeated herein.

Referring to FIG. 12, the embodiments of this disclosure further provide an SRS resource configuration method, applied to a terminal side. The method includes:

Step 1201: Receive first configuration information sent by a network device, where the first configuration information is used to configure a pattern of a sounding reference signal SRS resource, the SRS resource is distributed at equal intervals in frequency domain, an interval is M subcarriers, and M is an integer greater than 4.

Optionally, a comb structure corresponding to M subcarriers distributed at equal intervals in frequency domain is comb-M, and M is 6, 8, or 12.

Optionally, when M is 8, the pattern of the SRS resource includes two consecutive resource blocks RBs.

Optionally, the first configuration information is further used to configure a frequency domain shift of a comb structure of the SRS resource, that is, a comb offset, and the comb offset is used to indicate the lowest RE location of the last symbol of the SRS resource in a first RB.

Optionally, the first RB is any odd-numbered RB or even-numbered RB in the SRS resource.

Optionally, when M is 6 or 12, the pattern of the SRS resource includes one RB.

Optionally, the first configuration information is further used to configure a comb offset of the SRS resource, and the comb offset is used to indicate the lowest RE location of the last symbol of the SRS resource in an RB.

Optionally, the comb offset is a natural number less than M.

Optionally, the SRS resource occupies N consecutive symbols; where
  when M=6, N is 1, 2, 4, 6, or an integer greater than 6;
  when M=8, N is 1, 2, 4, 8, or an integer greater than 8; and
  when M=12, N is 1, 2, 4, 6, 8, 12, or an integer greater than 12.

Optionally, the consecutive N symbols occupied by the SRS resource are the first N symbols, or the last N symbols, or N symbols at any middle locations in a slot.

Optionally, the first configuration information is further used to configure a cyclic shift value and a repetition factor of the SRS resource.

Optionally, when M=6, the cyclic shift value is a natural number less than 8 and the repetition factor is 1, 2, 4, or 6;
  when M=8, the cyclic shift value is a natural number less than 6 and the repetition factor is 1, 2, 4, or 8; and
  when M=12, the cyclic shift value is a natural number less than 4 and the repetition factor is 1, 2, 4, 6, or 12.

Optionally, the first configuration information is further used to configure an RE shift between adjacent symbols of the SRS resource.

Optionally, when M=6, the RE shift is 1, 2, or 3; when M=8, the RE shift is 1, 2, or 4; and when M=12, the RE shift is 1, 2, 3, 4, or 6.

Optionally, the RE shift is used to calculate a frequency domain location of the SRS resource, and in a case that the frequency domain location of the SRS resource calculated according to the RE shift exceeds a preset frequency domain range, the frequency domain location of the SRS resource is: a location obtained after a modulo operation is performed on the frequency domain location according to a specific value.

Optionally, when M is 6 or 12, the preset frequency domain range is 1 RB, and the specific value is 12; and
when M is 8, the preset frequency domain range is 2 RBs, and the specific value is 24.

Optionally, the SRS resource is used for positioning.

Optionally, when a number N of symbols occupied by the SRS resource is greater than M, a frequency domain location of the $(M+Y)^{th}$ symbol from the last of the SRS resource is the same as a frequency domain location of the $Y^{th}$ symbol from the last, M+Y is less than or equal to N, and Y is a positive integer.

Optionally, a value of the frequency domain location of the $(M+Y)^{th}$ symbol from the last of the SRS resource is the same as a value of the frequency domain location of the $Y^{th}$ symbol from the last.

Optionally, the method further includes:
receiving first indication information sent by the network device, where the first indication information is used to indicate bandwidth information of the SRS resource.

Optionally, in a case that the first configuration information satisfies a first preset condition, the terminal performs a preset operation; and
in a case that the first configuration information does not satisfy the first preset condition, the terminal sends the SRS resource;
where the first preset condition includes any one of the following:
M=6, the bandwidth information of the SRS resource is 8 RBs, 16 RBs, or 32 RBs; and
M=12, the bandwidth information of the SRS resource is 4 RBs, 8 RBs, 16 RBs, 20 RBs, 28 RBs, or 32 RBs.

Optionally, the preset operation further includes:
skipping sending the SRS resource; or
truncating a generated sequence of the SRS resource and sending a truncated sequence.

Optionally, the first configuration information is not associated with an uplink bandwidth part UL BWP configuration.

Optionally, that the first configuration information is not associated with the UL BWP configuration is specified by a protocol or indicated by the network device.

Optionally, switching of the UL BWP is not associated with sending of the SRS resource by the terminal.

Optionally, that the first configuration information is not associated with the UL BWP configuration includes: bandwidth information and baseband parameter numerology of the SRS resource are not associated with the UL BWP configuration.

Optionally, the method further includes:
sending capability information of the terminal to the network device, where the capability information includes a maximum uplink transmission bandwidth that the terminal can support, and the maximum uplink transmission bandwidth is used by the network device to determine a frequency domain range of the SRS resource.

Figure 3:
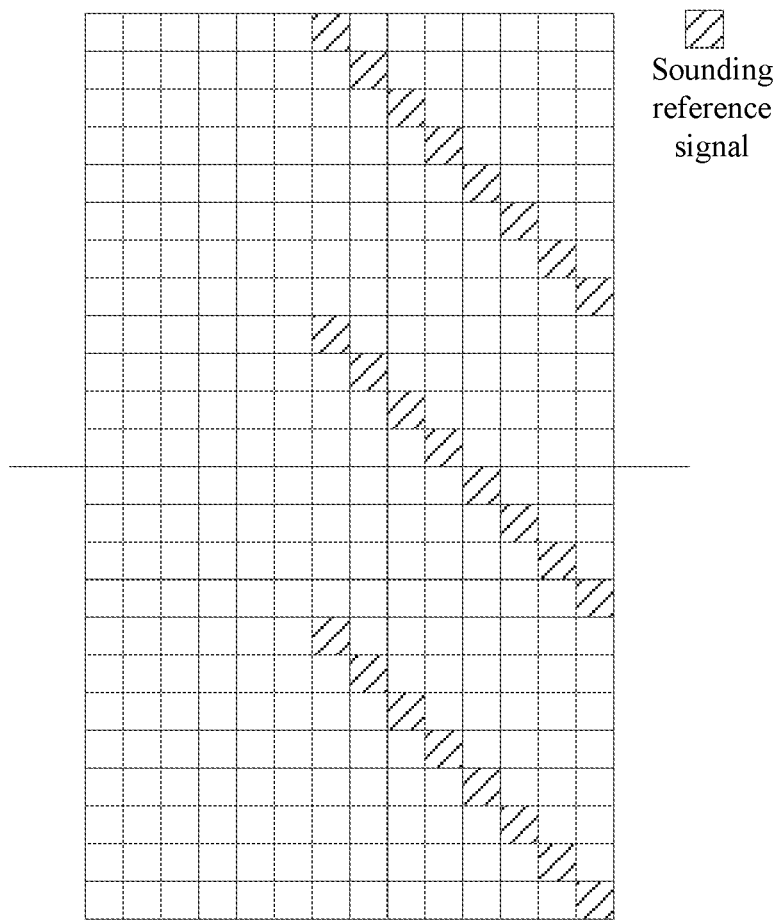
FIG. 3 is a diagram 1 of an example of a pattern of an SRS resource in an SRS resource configuration method according to an embodiment of the present disclosure.
Figure 4:
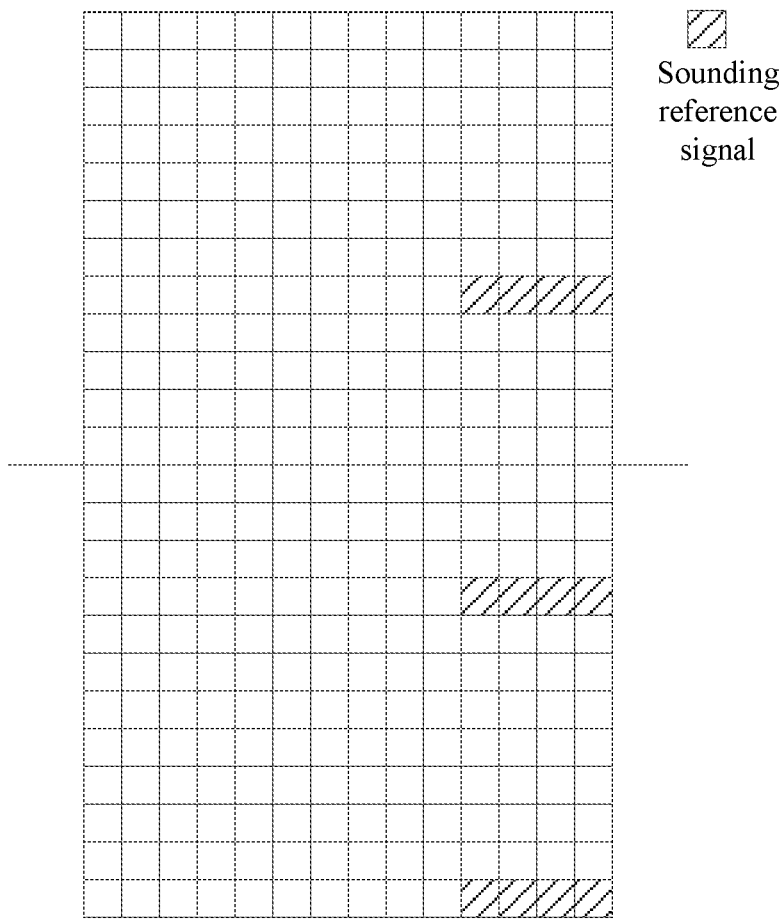
FIG. 4 is a diagram 2 of an example of a pattern of an SRS resource in an SRS resource configuration method according to an embodiment of the present disclosure.

It should be noted that this embodiment is an embodiment of the terminal corresponding to the embodiment shown in FIG. 3. For the specific implementation, refer to the relevant description of the embodiment shown in FIG. 3. The same technical effects can be achieved. To avoid repetition, details are not described herein again.

Figure 13:
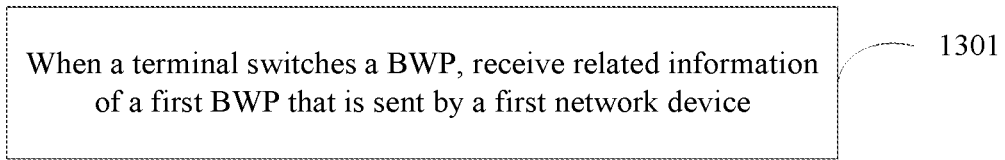
FIG. 13 is a flowchart 2 of a BWP switching processing method according to an embodiment of the present disclosure.

Further, referring to FIG. 13, the embodiments of the present disclosure further provide a bandwidth part BWP switching processing method, applied to a location server. The method includes:

Step 1301: When a terminal switches a BWP, receive related information of a first BWP that is sent by a first network device, where the first BWP is a BWP to which the terminal switches, the first BWP is used by the terminal to send a first object, and the first object includes an uplink positioning reference signal or an uplink positioning resource.

The related information of the first BWP is sent to a second network device, where the second network device includes a network device of network devices that participate in positioning of the terminal other than the first network device.

Optionally, the related information of the first BWP includes time domain configuration information of the first BWP, a configuration of the first BWP, or identifier information of the first BWP.

Optionally, the first object is a sounding reference signal SRS resource.

It should be noted that this embodiment is an embodiment of the location server corresponding to the embodiment shown in FIG. 11. For the specific implementation, refer to the relevant description of the embodiment shown in FIG. 11. The same technical effects can be achieved. To avoid repetition, details are not described herein again.

In the related art, during uplink positioning, it is configured that the SRS resource is sent in the UL BWP pre-configured for the terminal, thus limiting the transmission bandwidth of the SRS resource and limiting the positioning precision. Therefore, during uplink positioning, the relationship between the SRS and the BWP needs to be further studied. To improve the positioning precision, referring to FIG. 14, an embodiment of the present disclosure provides an SRS configuration method, applied to a terminal side. The method includes:

Step 1401: Receive fourth configuration information sent by a network device, where the fourth configuration information is used to configure the terminal to send a first object on a first BWP, the first BWP is an uplink bandwidth part UL BWP dedicated for positioning, and the first object includes an uplink positioning reference signal or an uplink positioning resource.

In the embodiments of the present disclosure, the terminal is configured with the first BWP dedicated for positioning, so that sending of the SRS resource is not limited by the bandwidth of the pre-configured UL BWP. Therefore, the embodiments of the present disclosure can improve the positioning precision.

Optionally, after the receiving fourth configuration information sent by a network device, the method further includes:
in a case that a second preset condition is not satisfied, performing, by the terminal, BWP switching; and
in a case that the second preset condition is satisfied, skipping, by the terminal, performing BWP switching;
where the second preset condition includes: the first BWP is included in a BWP currently activated by the terminal, and a baseband parameter of the first BWP is the same as a baseband parameter of the BWP currently activated by the terminal.

Optionally, before the performing, by the terminal, BWP switching, the method further includes:

receiving third indication information sent by the network device, where the third indication information is used to instruct the terminal to perform BWP switching.

Optionally, the first object is a sounding reference signal SRS resource.

To better understand the specific implementation process of the present disclosure, a specific implementation solution of the present disclosure is described in detail below:

Implementation solution 1:

When the SRS resource is configured for positioning, the network device may configure that a comb structure of the SRS resource is comb-8, which means that the SRS resource is distributed at equal intervals in the frequency domain, and the interval is 8 subcarriers. The comb-8 structure may be equivalent to density of 3/2 RE/PRB, that is, 3 REs are distributed at equal intervals in the 2 RBs. When the SRS resource is configured as the comb-8 structure, the UE should assume that the pattern of the SRS resource includes SRS resources of 2 consecutive RBs. The behavior of the UE may be indicated by the network or specified by the protocol.

The comb offset of the SRS resource may be an integer less than 8, which represents the lowest RE location of the last symbol of the SRS resource in an odd-numbered RB or an even-numbered RB. Alternatively, the comb offset of the SRS resource indicates the lowest RE location of the last symbol in a certain RB, and the network device additionally uses 1 bit to indicate whether the current lowest RE is on an odd-numbered RB or an even-numbered RB.

The consecutive N symbols occupied by the SRS resource may be the last N symbols, the first N symbols, or any consecutive N symbols in a slot. N may be 8, 4, 2, 1, or an integer greater than 8.

When the SRS resource is the comb-8 structure, the network device may also configure a cyclic shift value and a repetition factor of the SRS resource, the cyclic shift value is an integer less than 6, and the repetition factor is 1, 2, 4, or 8.

When the SRS resource is a comb-8 structure, the network device may also configure an RE shift between adjacent symbols of the SRS resource. The RE shift is an RE-level shift (a frequency domain offset) between adjacent symbols of the SRS resource. An RE frequency domain location of a former symbol may be obtained based on an RE frequency domain location of a latter adjacent symbol and a configured RE shift. When an RE of a symbol on an odd-numbered RB or an even-numbered RB exceeds the range of two consecutive RBs after calculation based on the RE shift, a modulo operation (mod 24) may be performed so that an RE frequency domain location may fall within the range of the consecutive 2 RBs. The RE shift may be a positive or negative offset. Further, for comb-8, the RE shift may be 1, 2, or 4. When the RE shift is not configured, the UE should assume that REs of all symbols of the SRS resource have the same positions in frequency domain.

Further, when the SRS resource is not used for positioning, the SRS resource of the comb-8 structure described above may also be used for other functions.

Further, when the SRS resource is used for positioning, no matter how the SRS comb structure is configured, one or more consecutive symbols occupied by the SRS resource may be the last one or more symbols, or the first one or more symbols, or any consecutive one or more symbols in the middle in a slot.

In the embodiments of the present disclosure, the SRS resource may be the repetition of an SRS of the last X symbols. When the SRS resource is used for positioning, no matter how the comb structure of the SRS resource is configured, the number N of symbols of the SRS resource may be greater than a comb size X of the SRS. When the number N of symbols of the SRS resource is greater than the comb size X of the SRS, a frequency domain location (an RE position) of the $(X+Y)^{th}$ symbol from the last of the SRS resource may be the same as a frequency domain location (an RE position) of the $Y^{th}$ symbol from the last, where $X+Y \leq N$. A value of the frequency domain location (an RE position) of the $(X+Y)^{th}$ symbol from the last of the SRS resource may also be the same as a value of the frequency domain location (an RE position) of the $Y^{th}$ symbol from the last. Specifically, refer to the pattern of the SRS resource shown in FIG. 5 to FIG. 10:

Further, regardless of whether the SRS resource is used for positioning, if the network device configures the comb structure of the SRS resource to be comb-12, and a bandwidth of a broadband SRS or a narrowband SRS is configured to 4 RBs, 8 RBs, 16 RBs, 20 RBs, 28 RBs, or 32 RBs, the terminal does not send the SRS resource. Correspondingly, the network device does not receive the SRS resource. Alternatively, if the network device configures the comb structure of the SRS resource to be comb-12, and the bandwidth of the broadband SRS or the narrowband SRS is configured to 4 RBs, 8 RBs, 16 RBs, 20 RBs, 28 RBs, or 32 RBs, the terminal needs to truncate a generated sequence (a low-PAPR sequence or a ZC sequence) of the SRS resource and then send the truncated sequence. Correspondingly, the network device receives the SRS resource. A behavior of the terminal may be indicated by the network device, specified by the protocol, or selected by the terminal.

If the network device configures the comb structure of the SRS resource to be comb-6, and a bandwidth of a broadband SRS or a narrowband SRS is configured to 8 RBs, 16 RBs, or 32 RBs, the UE does not send the SRS. Correspondingly, the network device does not receive the SRS. Alternatively, if the network device configures the comb structure of the SRS resource to be comb-6, and the bandwidth of the broadband SRS or the narrowband SRS is configured to 8 RBs, 16 RBs, or 32 RBs, the UE needs to truncate a generated sequence (a low-PAPR sequence or a ZC sequence) of the SRS resource and then send the truncated sequence. Correspondingly, the network device receives the SRS resource. A behavior of the terminal may be indicated by the network device, specified by the protocol, or selected by the terminal.

If the network device configures the comb structure of the SRS resource to be comb-6, and a bandwidth of a broadband SRS or a narrowband SRS is configured to 8 RBs, 16 RBs, or 32 RBs, the UE does not send the SRS. Correspondingly, the network device does not receive the SRS. Alternatively, if the network device configures the comb structure of the SRS resource to be comb-6, and the bandwidth of the broadband SRS or the narrowband SRS is configured to 8 RBs, 16 RBs, or 32 RBs, the UE needs to truncate a generated sequence (a low-PAPR sequence or a ZC sequence) of the SRS resource and then send the truncated sequence. Correspondingly, the network device receives the SRS resource. A behavior of the terminal may be indicated by the network device, specified by the protocol, or selected by the terminal.

Solution 2: During uplink positioning, configuration methods of the bandwidth of the SRS resource include the following three methods:

Method 1: When the SRS resource is used for positioning, a serving gNB (or cell) configures that the SRS resource is sent in a UL active BWP. SRS configuration information sent by the serving gNB (or cell) to a location server may include UL BWP information associated with the SRS. The UL BWP information may be active UL BWP configuration information and/or all UL BWP information configured for the UE. Then, the location server may notify UL BWP information associated with the SRS of other gNBs (or cells) participating in positioning, or configure UL BWP information associated with the SRS for other gNBs (or cells) participating in positioning.

When the UL BWP is switched, the serving gNB notifies the location server of a new UL BWP configuration or new UL BWP ID information, and the time domain configuration information of the new BWP, and then the location server notifies the information to other gNBs participating in the positioning. Alternatively, the serving gNB directly notifies other gNBs participating in positioning of the new UL BWP configuration or the new UL BWP ID information, and the time domain configuration information of the new BWP through an Xn interface.

Further, the uplink resource used for positioning may not be limited to SRS, and further may be other uplink positioning reference signals or uplink positioning resources.

Method 2: During uplink positioning, the network device configures a dedicated UL BWP for positioning for the UE, where the dedicated UL BWP may be referred to as a 'UL positioning BWP'. According to the configuration information, the UE sends, on the 'UL positioning BWP', the SRS resource for positioning.

Further, the maximum bandwidth of the 'UL positioning BWP' is related to the capability of the UE. The network device may obtain the maximum bandwidth of the 'UL positioning BWP' according to capability information reported by the UE, and configure a frequency domain range of the 'UL positioning BWP'. Further, it may be configured that the 'UL positioning BWP' does not fall within the active UL BWP. Further, the frequency domain range of the 'UL positioning BWP' may fall within the UL BWP configuration or not fall within the UL BWP configuration. Optionally, the UE may be configured with a maximum of 4 BWPs. Falling within the UL BWP configuration means that the frequency domain range of the 'UL positioning BWP' does not exceed a frequency domain range occupied by all the 4 BWPs.

Further, the configuration information of the 'UL positioning BWP' may include a BWP ID, numerology information, bandwidth information, a frequency domain location, configuration information associated with the SRS resource, and the like. The network device needs to report the configuration information of the 'UL positioning BWP' to the location server, and the location server should notify/configure the information associated with the 'UL positioning BWPs' to other gNBs (or cells) participating in positioning.

Further, the configuration information of the 'UL positioning BWP' may include a BWP ID, numerology information, bandwidth information, a frequency domain location, configuration information associated with the SRS, and the like. The network device needs to report the configuration information of the 'UL positioning BWP' to the location server, and the location server should notify/configure the information associated with the 'UL positioning BWPs' to other gNBs (or cells) participating in positioning.

Further, when the network device configures that the SRS resource is used for uplink positioning, if the 'UL positioning BWP' is allocated in a current UL BWP and has numerology that is the same as that of the current BWP, the UE does not need to switch to the 'UL positioning BWP'. Otherwise, the network device instructs the UE to switch to the 'UL positioning BWP. When the uplink positioning ends or terminates, if the current BWP is the 'UL positioning BWP', the network device instructs the UE to switch to the new 'UL BWP'. Otherwise, the UE does not need to switch the BWP. When BWP switching occurs, the network device needs to report BWP switching information to the location server, and then the location server notifies or configures the BWP switching information to other gNBs (or cells) participating in positioning.

Further, the uplink resource used for positioning may not be limited to SRS, and further may be other uplink positioning reference signals or uplink positioning resources.

Method 3: During uplink positioning, the UE assumes that SRS configuration information configured to the UE for positioning is not associated with the UL BWP (s) configured to the UE, and the behavior of the UE may be indicated by the network or specified by the protocol. Further, the bandwidth and numerology of the SRS resource may not be limited by the BWP. Further, the maximum bandwidth of the SRS resource is related to the capability of the UE, and the network device may configure the frequency domain range of the SRS resource according to the maximum uplink transmission bandwidth that the terminal can support in the capability information reported by the UE. Further, the frequency domain range of the SRS resource may fall within the UL BWP configuration, or may not fall within the UL BWP configuration. According to a configuration of the network device, the UE sends the SRS resource for positioning.

Further, during switching of the UL BWP, the UE may always send the SRS resource. Alternatively, during switching of the UL BWP, the UE stops sending the SRS resource.

Further, the uplink resource used for positioning may not be limited to the SRS resource, and further may be other uplink positioning reference signals or uplink positioning resources.

Figure 15:
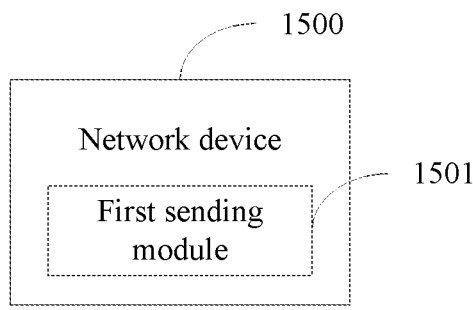
FIG. 15 is a structural diagram 1 of a network device according to an embodiment of the present disclosure.

Referring to FIG. 15, FIG. 15 is a structural diagram of a network device according to an embodiment of the present disclosure. As shown in FIG. 15, the network device 1500 includes:

a first sending module 1501, configured to send first configuration information to a terminal, where the first configuration information is used to configure a pattern of a sounding reference signal SRS resource, the SRS resource is distributed at equal intervals in frequency domain, an interval is M subcarriers, and M is an integer greater than 4.

Optionally, a comb structure corresponding to M subcarriers distributed at equal intervals in frequency domain is comb-M, and M is 6, 8, or 12.

Optionally, when M is 8, the pattern of the SRS resource includes two consecutive resource blocks RBs.

Optionally, the first configuration information is further used to configure a frequency domain shift of a comb structure of the SRS resource, that is, a comb offset, and the comb offset is used to indicate the lowest RE location of the last symbol of the SRS resource in a first RB.

Optionally, the first RB is any odd-numbered RB or even-numbered RB in the SRS resource.

Optionally, when M is 6 or 12, the pattern of the SRS resource includes one RB.

Optionally, the first configuration information is further used to configure a comb offset of the SRS resource, and the comb offset is used to indicate the lowest RE location of the last symbol of the SRS resource in an RB.

Optionally, the comb offset is a natural number less than M.

Optionally, the SRS resource occupies N consecutive symbols; where
when M=6, N is 1, 2, 4, 6, or an integer greater than 6; when M=8, N is 1, 2, 4, 8, or an integer greater than 8; and
when M=12, N is 1, 2, 4, 6, 8, 12, or an integer greater than 12.

Optionally, the consecutive N symbols occupied by the SRS resource are the first N symbols, or the last N symbols, or N symbols at any middle locations in a slot.

Optionally, the first configuration information is further used to configure a cyclic shift value and a repetition factor of the SRS resource.

Optionally, when M=6, the cyclic shift value is a natural number less than 8 and the repetition factor is 1, 2, 4, or 6; when M=8, the cyclic shift value is a natural number less than 6 and the repetition factor is 1, 2, 4, or 8; and
when M=12, the cyclic shift value is a natural number less than 4 and the repetition factor is 1, 2, 4, 6, or 12.

Optionally, the first configuration information is further used to configure an RE shift between adjacent symbols of the SRS resource.

Optionally, when M=6, the RE shift is 1, 2, or 3; when M=8, the RE shift is 1, 2, or 4; and
when M=12, the RE shift is 1, 2, 3, 4, or 6.

Optionally, the RE shift is used to calculate a frequency domain location of the SRS resource, and in a case that the frequency domain location of the SRS resource calculated according to the RE shift exceeds a preset frequency domain range, the frequency domain location of the SRS resource is: a location obtained after a modulo operation is performed on the frequency domain location according to a specific value.

Optionally, when M is 6 or 12, the preset frequency domain range is 1 RB, and the specific value is 12; and
when M is 8, the preset frequency domain range is 2 RBs, and the specific value is 24.

Optionally, the SRS resource is used for positioning.

Optionally, when a number N of symbols occupied by the SRS resource is greater than M, a frequency domain location of the $(M+Y)^{th}$ symbol from the last of the SRS resource is the same as a frequency domain location of the $Y^{th}$ symbol from the last, M+Y is less than or equal to N, and Y is a positive integer.

Optionally, a value of the frequency domain location of the $(M+Y)^{th}$ symbol from the last of the SRS resource is the same as a value of the frequency domain location of the $Y^{th}$ symbol from the last.

Optionally, the first sending module 1501 is further configured to:
send first indication information to the terminal, where the first indication information is used to indicate bandwidth information of the SRS resource.

Optionally, in a case that the first configuration information satisfies a first preset condition, the first configuration information is further used to instruct the terminal to perform a preset operation;
where the first preset condition includes any one of the following:
M=6, the bandwidth information of the SRS resource is 8 RBs, 16 RBs, or 32 RBs; and M=12, the bandwidth information of the SRS resource is 4 RBs, 8 RBs, 16 RBs, 20 RBs, 28 RBs, or 32 RBs.

Optionally, the preset operation further includes:
skipping sending the SRS resource; or
truncating a generated sequence of the SRS resource and sending a truncated sequence.

Optionally, the first configuration information is not associated with an uplink bandwidth part UL BWP configuration of the terminal.

Optionally, the first sending module 1501 is further configured to: send second indication information to the terminal, where the second indication information is used to indicate that the first configuration information is not associated with the UL BWP configuration.

Optionally, the first configuration information is not associated with the UL BWP configuration includes: bandwidth information and baseband parameter numerology of the SRS resource are not associated with the UL BWP configuration.

Optionally, the network device 1500 further includes:
a fourth receiving module, configured to receive capability information sent by the terminal, where the capability information includes a maximum uplink transmission bandwidth that the terminal can support; and
a determining module, configured to determine a frequency domain range of the SRS resource according to the maximum uplink transmission bandwidth.

The network device provided in embodiments of the present disclosure can implement the processes implemented by the network device in the method embodiment of FIG. 3. To avoid repetition, details are not described herein again.

Figure 16:
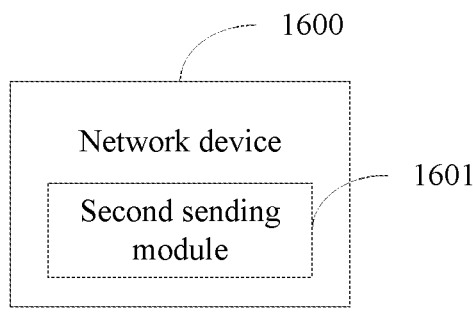
FIG. 16 is a structural diagram 2 of a network device according to an embodiment of the present disclosure.

Referring to FIG. 16, FIG. 16 is a structural diagram of a network device according to an embodiment of the present disclosure. The network device is a first network device that currently serves a terminal. As shown in FIG. 16, the network device 1600 includes:
a second sending module 1601, configured to: when the terminal switches a BWP, send related information of a first BWP to which the terminal switches to a second network device, where the second network device includes a network device of network devices that participate in positioning of the terminal other than the first network device, the first BWP is used by the terminal to send a first object, and the first object includes an uplink positioning reference signal or an uplink positioning resource.

Optionally, the second sending module 1601 is specifically configured to directly send the related information of the first BWP to the second network device through an Xn interface; or
send the related information of the first BWP to a location server, so that the location server forwards the related information of the first BWP to the second network device.

Optionally, the related information of the first BWP includes time domain configuration information of the first BWP, a configuration of the first BWP, or identifier information of the first BWP.

Optionally, the second sending module 1601 is further configured to send second configuration information to the terminal, where the second configuration information is used to configure the terminal to send the first object in an uplink active bandwidth part UL active BWP.

Optionally, the second sending module 1601 is further configured to send third configuration information to the terminal, where the third configuration information is configuration information of the first BWP, the third configuration information is used to configure the terminal to send the first object on the first BWP, and the first BWP is an uplink bandwidth part UL BWP dedicated for positioning.

Optionally, the second sending module 1601 is further configured to: in a case that a second preset condition is not satisfied, send third indication information to the terminal, where the third indication information is used to instruct the terminal to perform BWP switching;

where the second preset condition includes: the first BWP is included in a BWP currently activated by the terminal, and a baseband parameter of the first BWP is the same as a baseband parameter of the BWP currently activated by the terminal.

Optionally, the configuration information of the first BWP includes at least one of identifier information of the first BWP, baseband parameter numerology information of the first BWP, bandwidth information of the first BWP, frequency domain location information of the first BWP, and configuration information of the first object.

Optionally, the first object is a sounding reference signal SRS resource.

The network device provided in embodiments of the present disclosure can implement the processes implemented by the network device in the method embodiment of FIG. 11. To avoid repetition, details are not described herein again.

Figure 17:
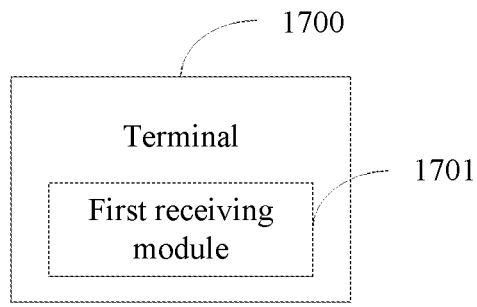
FIG. 17 is a structural diagram 1 of a terminal according to an embodiment of the present disclosure.

Referring to FIG. 17, FIG. 17 is a structural diagram of a terminal according to an embodiment of the present disclosure. As shown in FIG. 17, the terminal 1700 includes:

a first receiving module 1701, configured to receive first configuration information sent by a network device, where the first configuration information is used to configure a pattern of a sounding reference signal SRS resource, the SRS resource is distributed at equal intervals in frequency domain, an interval is M subcarriers, and M is an integer greater than 4.

Optionally, a comb structure corresponding to M subcarriers distributed at equal intervals in frequency domain is comb-M, and M is 6, 8, or 12.

Optionally, when M is 8, the pattern of the SRS resource includes two consecutive resource blocks RBs.

Optionally, the first configuration information is further used to configure a frequency domain shift of a comb structure of the SRS resource, that is, a comb offset, and the comb offset is used to indicate the lowest RE location of the last symbol of the SRS resource in a first RB.

Optionally, the first RB is any odd-numbered RB or even-numbered RB in the SRS resource.

Optionally, when M is 6 or 12, the pattern of the SRS resource includes one RB.

Optionally, the first configuration information is further used to configure a comb offset of the SRS resource, and the comb offset is used to indicate the lowest RE location of the last symbol of the SRS resource in an RB.

Optionally, the comb offset is a natural number less than M.

Optionally, the SRS resource occupies N consecutive symbols; where when M=6, N is 1, 2, 4, 6, or an integer greater than 6;
when M=8, N is 1, 2, 4, 8, or an integer greater than 8; and
when M=12, N is 1, 2, 4, 6, 8, 12, or an integer greater than 12.

Optionally, the consecutive N symbols occupied by the SRS resource are the first N symbols, or the last N symbols, or N symbols at any middle locations in a slot.

Optionally, the first configuration information is further used to configure a cyclic shift value and a repetition factor of the SRS resource.

Optionally, when M=6, the cyclic shift value is a natural number less than 8 and the repetition factor is 1, 2, 4, or 6;
when M=8, the cyclic shift value is a natural number less than 6 and the repetition factor is 1, 2, 4, or 8; and
when M=12, the cyclic shift value is a natural number less than 4 and the repetition factor is 1, 2, 4, 6, or 12.

Optionally, the first configuration information is further used to configure an RE shift between adjacent symbols of the SRS resource.

Optionally, when M=6, the RE shift is 1, 2, or 3;
when M=8, the RE shift is 1, 2, or 4; and
when M=12, the RE shift is 1, 2, 3, 4, or 6.

Optionally, the RE shift is used to calculate a frequency domain location of the SRS resource, and in a case that the frequency domain location of the SRS resource calculated according to the RE shift exceeds a preset frequency domain range, the frequency domain location of the SRS resource is: a location obtained after a modulo operation is performed on the frequency domain location according to a specific value.

Optionally, when M is 6 or 12, the preset frequency domain range is 1 RB, and the specific value is 12; and
when M is 8, the preset frequency domain range is 2 RBs, and the specific value is 24.

Optionally, the SRS resource is used for positioning.

Optionally, when a number N of symbols occupied by the SRS resource is greater than M, a frequency domain location of the $(M+Y)^{th}$ symbol from the last of the SRS resource is the same as a frequency domain location of the $Y^{th}$ symbol from the last, M+Y is less than or equal to N, and Y is a positive integer.

Optionally, a value of the frequency domain location of the $(M+Y)^{th}$ symbol from the last of the SRS resource is the same as a value of the frequency domain location of the $Y^{th}$ symbol from the last.

Optionally, the first receiving module 1701 is further configured to:

receive first indication information sent by the network device, where the first indication information is used to indicate bandwidth information of the SRS resource.

Optionally, in a case that the first configuration information satisfies a first preset condition, the terminal performs a preset operation; and in a case that the first configuration information does not satisfy the first preset condition, the terminal sends the SRS resource;

where the first preset condition includes any one of the following:

M=6, the bandwidth information of the SRS resource is 8 RBs, 16 RBs, or 32 RBs; and
M=12, the bandwidth information of the SRS resource is 4 RBs, 8 RBs, 16 RBs, 20 RBs, 28 RBs, or 32 RBs.

Optionally, the preset operation further includes:
skipping sending the SRS resource; or
truncating a generated sequence of the SRS resource and sending a truncated sequence.

Optionally, the first configuration information is not associated with an uplink bandwidth part UL BWP configuration.

Optionally, that the first configuration information is not associated with the UL BWP configuration is specified by a protocol or indicated by the network device.

Optionally, switching of the UL BWP is not associated with sending of the SRS resource by the terminal.

Optionally, the first configuration information is not associated with the UL BWP configuration includes: bandwidth information and baseband parameter numerology of the SRS resource are not associated with the UL BWP configuration.

Optionally, the terminal 1700 further includes:
- a fourth sending module, configured to send capability information of the terminal to the network device, where the capability information includes a maximum uplink transmission bandwidth that the terminal can support, and the maximum uplink transmission bandwidth is used by the network device to determine a frequency domain range of the SRS resource.

A terminal according to an embodiment of the present disclosure can implement the processes of terminal in the embodiment in FIG. 12. To avoid repetition, details are not described herein again.

Figure 18:
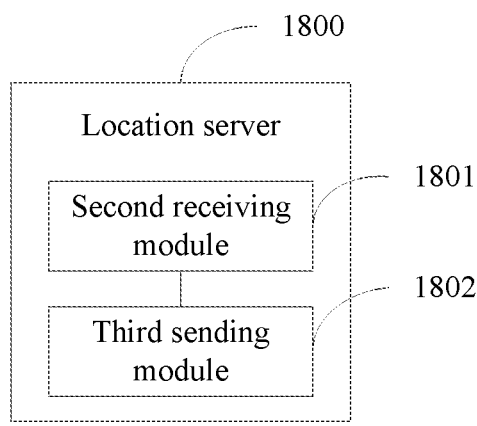
FIG. 18 is a structural diagram 1 of a location server according to an embodiment of the present disclosure.

Referring to FIG. 18, FIG. 18 is a structural diagram of a location server according to an embodiment of the present disclosure. As shown in FIG. 18, a location server 1800 includes:
- a second receiving module 1801, configured to: when a terminal switches a BWP, receive related information of a first BWP that is sent by a first network device, where the first BWP is a BWP to which the terminal switches, the first BWP is used by the terminal to send a first object, and the first object includes an uplink positioning reference signal or an uplink positioning resource; and
- a third sending module 1802, configured to send the related information of the first BWP to a second network device, where the second network device includes a network device of network devices that participate in positioning of the terminal other than the first network device.

Optionally, the related information of the first BWP includes time domain configuration information of the first BWP, a configuration of the first BWP, or identifier information of the first BWP.

Optionally, the first object is a sounding reference signal SRS resource.

The location server provided in this embodiment of the present disclosure can implement the processes performed by the location server in the method embodiment in FIG. 13. To avoid repetition, details are not described herein again.

Figure 19:
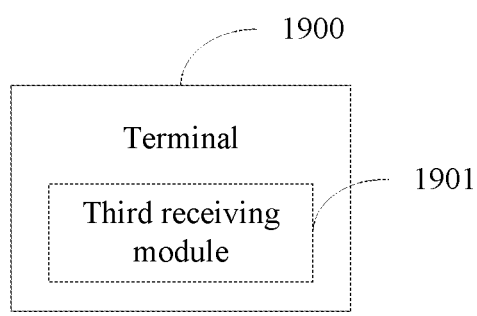
FIG. 19 is a structural diagram 2 of a terminal according to an embodiment of the present disclosure.

Referring to FIG. 19, FIG. 19 is a structural diagram of a terminal according to an embodiment of the present disclosure. As shown in FIG. 19, the terminal 1900 includes:
- a third receiving module 1901, configured to receive fourth configuration information sent by a network device, where the fourth configuration information is used to configure the terminal to send a first object on a first BWP, the first BWP is an uplink bandwidth part UL BWP dedicated for positioning, and the first object includes an uplink positioning reference signal or an uplink positioning resource.

Optionally, in a case that a second preset condition is not satisfied, performing, by the terminal, BWP switching; and
- in a case that the second preset condition is satisfied, skipping, by the terminal, performing BWP switching;
- where the second preset condition includes: the first BWP is included in a BWP currently activated by the terminal, and a baseband parameter of the first BWP is the same as a baseband parameter of the BWP currently activated by the terminal.

Optionally, before the terminal switches the BWP, the third receiving module 1901 is further configured to receive third indication information sent by the network device, where the third indication information is used to instruct the terminal to perform BWP switching.

Optionally, the first object is a sounding reference signal SRS resource.

Figure 14:
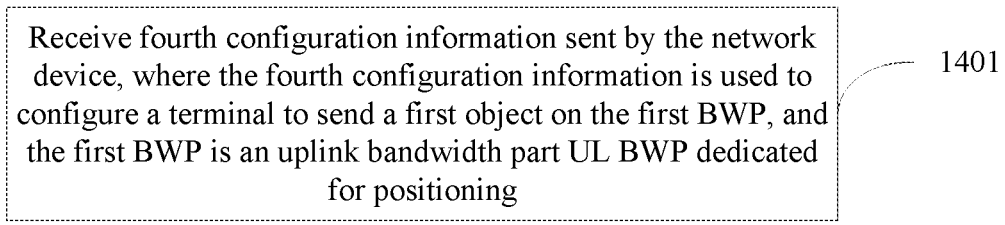
FIG. 14 is a flowchart 3 of an SRS resource configuration method according to an embodiment of the present disclosure.

The terminal provided in this embodiment of the present disclosure can implement the processes performed by the terminal in the method embodiment in FIG. 14. To avoid repetition, details are not described herein again.

Figure 20:
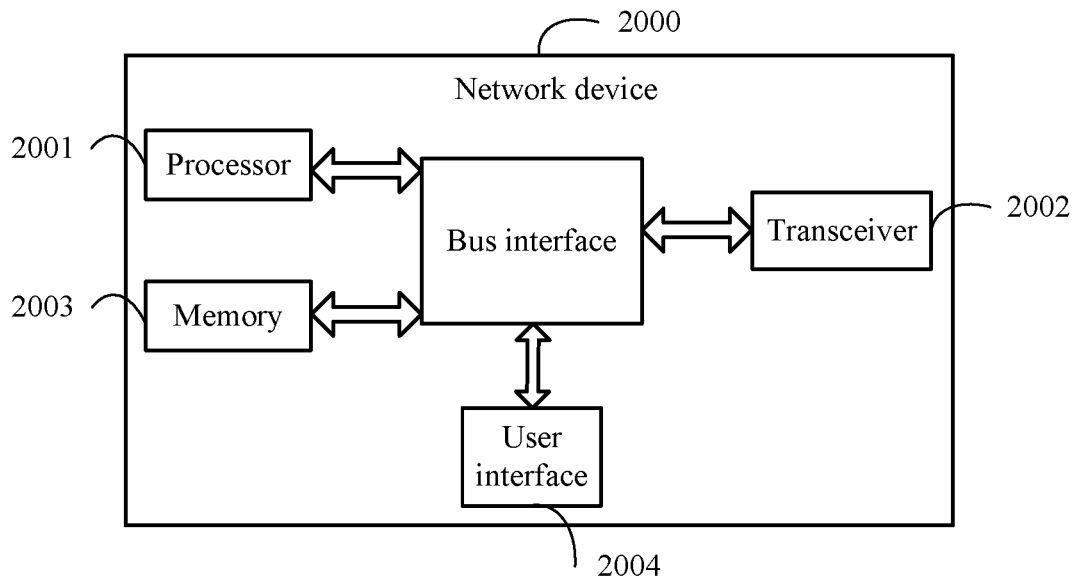
FIG. 20 is a structural diagram 3 of a network device according to an embodiment of the present disclosure.

Referring to FIG. 20, FIG. 20 is a structural diagram of another network device according to an embodiment of the present disclosure. As shown in FIG. 20, the network device 2000 includes: a processor 2001, a transceiver 2002, a memory 2003 and a bus interface.

The transceiver 2002 is configured to send first configuration information to a terminal, where the first configuration information is used to configure a pattern of a sounding reference signal SRS resource, the SRS resource is distributed at equal intervals in frequency domain, an interval is M subcarriers, and M is an integer greater than 4.

Alternatively, the transceiver 2002 is configured to: when the terminal switches a BWP, send related information of a first BWP to which the terminal switches to a second network device, where the second network device includes a network device of network devices that participate in positioning of the terminal other than the first network device, the first BWP is used by the terminal to send a first object, and the first object includes an uplink positioning reference signal or an uplink positioning resource.

In FIG. 20, the bus architecture may include any number of interconnected buses and bridges, which are specifically connected together by various circuits of one or more processors represented by the processor 2001 and a memory represented by the memory 2003. The bus architecture may further link various other circuits such as a peripheral device, a voltage regulator, and a power management circuit together. These are all well-known in the art, and therefore are not further described in this specification. The bus interface provides an interface. The transceiver 2002 may be a plurality of elements, that is, include a transmitter and a receiver, and provide units for communication with various other apparatuses on a transmission medium. For different user equipments, the user interface 2004 may alternatively be an interface for externally and internally connecting a required device. The connected device includes, but not limited to, a keypad, a display, a loudspeaker, a microphone, a joystick, and the like.

The processor 2001 is responsible for management of a bus architecture and general processing. The memory 2003 may store data used when the processor 2001 performs an operation.

Optionally, an embodiment of the present disclosure further provides a network device, including a processor 2001, a memory 2003, and a computer program stored in the memory 2003 and executable on the processor 2001. When the computer program is executed by the processor 2001, each process of the embodiments of the foregoing SRS resource configuration method can be implemented, and a same technical effect can be achieved. To avoid repetition, details are not described herein again.

Figure 21:
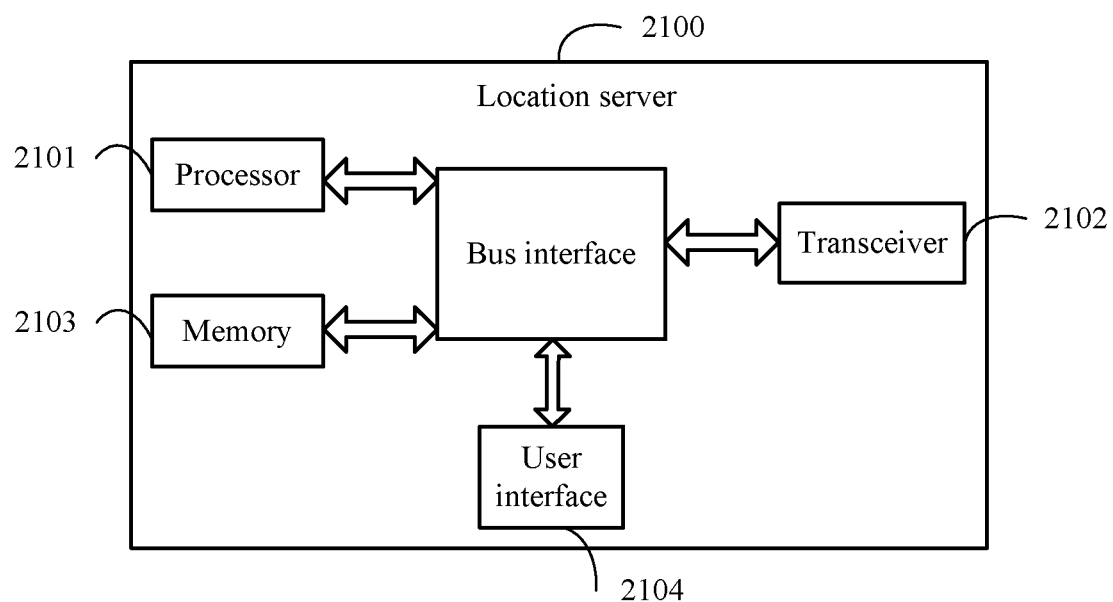
FIG. 21 is a structural diagram 2 of a location server according to an embodiment of the present disclosure.

Referring to FIG. 21, FIG. 21 is a structural diagram of another location server according to an embodiment of the present disclosure. As shown in FIG. 21, the location server 2100 includes: a processor 2101, a transceiver 2102, a memory 2103, and a bus interface.

The transceiver 2102 is configured to: when a terminal switches a BWP, receive related information of a first BWP that is sent by a first network device, where the first BWP is a BWP to which the terminal switches, the first BWP is used by the terminal to send a first object, and the first object includes an uplink positioning reference signal or an uplink positioning resource; and send the related information of the first BWP to a second network device, where the second network device includes a network device of network devices that participate in positioning of the terminal other than the first network device.

In FIG. 21, the bus architecture may include any number of interconnected buses and bridges, which are specifically connected together by various circuits of one or more processors represented by the processor 2101 and a memory represented by the memory 2103. The bus architecture may further link various other circuits such as a peripheral device, a voltage regulator, and a power management circuit together. These are all well-known in the art, and therefore are not further described in this specification. The bus interface provides an interface. The transceiver 2102 may be a plurality of elements, that is, include a transmitter and a receiver, and provide units for communication with various other apparatuses on a transmission medium. For different user equipments, the user interface 2104 may alternatively be an interface for externally and internally connecting a required device. The connected device includes, but not limited to, a keypad, a display, a loudspeaker, a microphone, a joystick, and the like.

The processor 2101 is responsible for management of a bus architecture and general processing. The memory 2103 may store data used when the processor 2101 performs an operation.

Optionally, an embodiment of the present disclosure further provides a location server, including a processor 2101, a memory 2103, and a computer program stored in the memory 2103 and executable on the processor 2101. When the computer program is executed by the processor 2101, each process of the embodiments of the foregoing BWP switching processing method is implemented, and same technical effects can be achieved. To avoid repetition, details are not described herein again.

Figure 22:
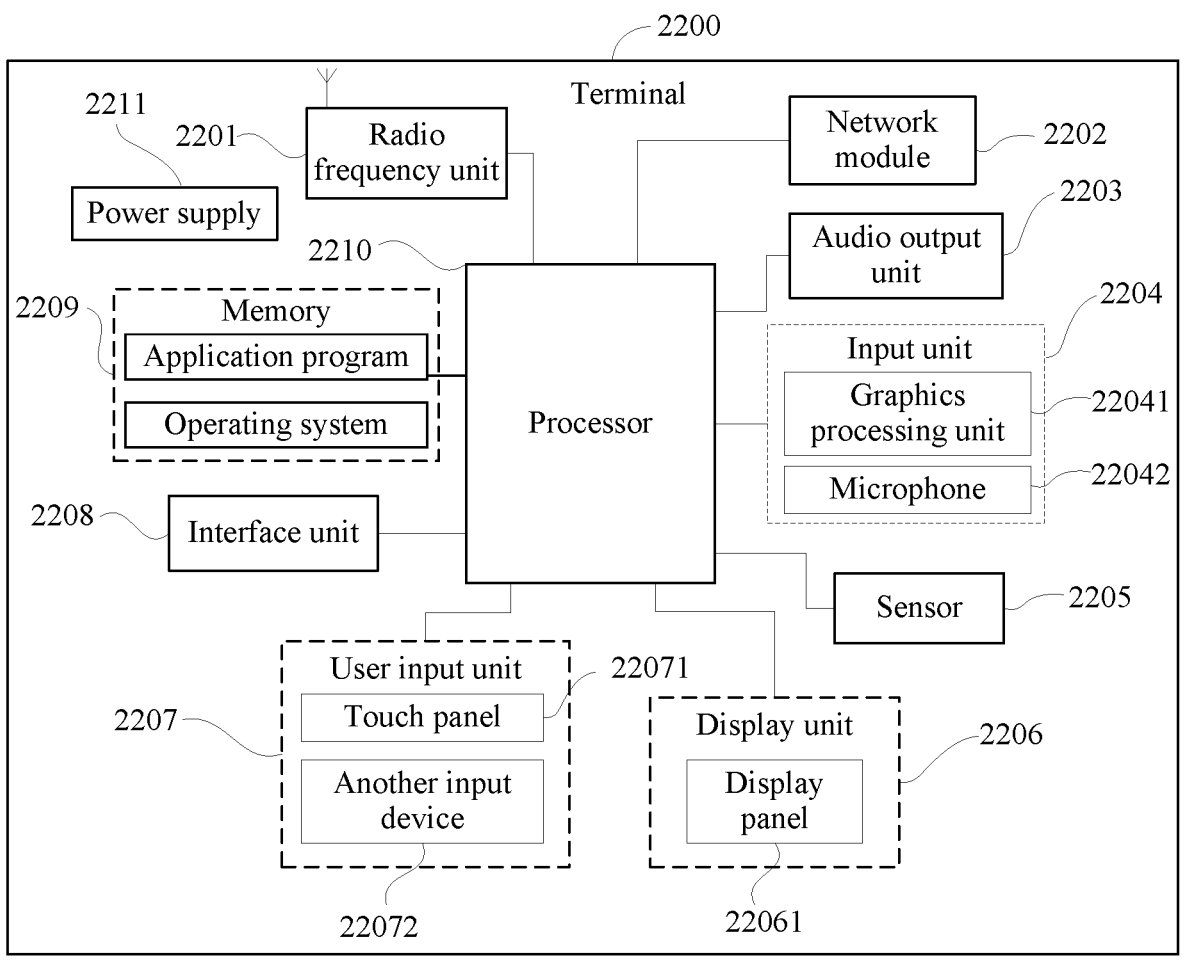
FIG. 22 is a structural diagram 3 of a terminal according to an embodiment of the present disclosure.

FIG. 22 is a schematic diagram of a hardware structure of a terminal implementing various embodiments of this disclosure.

The terminal 2200 includes but is not limited to: a radio frequency unit 2201, a network module 2202, an audio output unit 2203, an input unit 2204, a sensor 2205, a display unit 2206, a user input unit 2207, an interface unit 2208, a memory 2209, a processor 2210, a power supply 2211, and the like. A person skilled in the art may understand that the structure of the terminal shown in FIG. 22 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 2201 is configured to receive first configuration information sent by a network device, where the first configuration information is used to configure a pattern of a sounding reference signal SRS resource, the SRS resource is distributed at equal intervals in frequency domain, an interval is M subcarriers, and M is an integer greater than 4.

Alternatively, the radio frequency unit 2201 is configured to receive fourth configuration information sent by a network device, where the fourth configuration information is used to configure the terminal to send a first object on a first BWP, the first BWP is an uplink bandwidth part UL BWP dedicated for positioning, and the first object includes an uplink positioning reference signal or an uplink positioning resource.

It should be understood that, in embodiments of the present disclosure, the radio frequency unit 2201 may be configured to receive and send information or receive and send a signal in a call process. Optionally, after receiving downlink data from a base station, the radio frequency unit sends the downlink data to the processor 2210 for processing. In addition, the radio frequency unit sends uplink data to the base station. Generally, the radio frequency unit 2201 includes, but is not limited to, an antenna, at least one amplifier, a transceiver, a coupler, a low noise amplifier, and a duplexer, and the like. In addition, the radio frequency unit 2201 may further communicate with other devices through a wireless communications system and network.

The terminal provides wireless broadband Internet access to a user through the network module 2202, for example, helps the user receive and send e-mails, browse web pages, and access streaming media, etc.

The audio output unit 2203 may convert audio data received by the radio frequency unit 2201 or the network module 2202 or stored in the memory 2209 into an audio signal, and output the audio signal into sound. Moreover, the audio output unit 2203 may further provide audio output (for example, call signal receiving sound and message receiving sound) related to a specific function performed by the terminal 2200. The audio output unit 2203 includes a loudspeaker, a buzzer, a receiver, and the like.

The input unit 2204 is configured to receive audio or video signals. The input unit 2204 may include a graphics processing unit (GPU) 22041 and a microphone 22042. The graphics processing unit 22041 is configured to process image data of a static picture or a video obtained by an image capture apparatus (for example, a camera) in a video capture mode or an image capture mode. A processed image frame may be displayed on the display unit 2206. The image frame processed by the graphics processing unit 22041 may be stored in the memory 2209 (or another storage medium) or sent through the radio frequency unit 2201 or the network module 2202. The microphone 22042 may receive a sound and can process such sound into audio data. The processed audio data can be converted into a format that can be sent to a mobile communications base station through the radio frequency unit 2201 in a telephone call mode, for outputting.

The terminal 2200 further includes at least one sensor 2205, for example, an optical sensor, a motion sensor, and other sensors. Optionally, the optical sensor includes an ambient optical sensor and a proximity sensor. The ambient optical sensor can adjust a brightness of a display panel 22061 based on a brightness of ambient light. The proximity sensor can close the display panel 22061 and/or backlight when the terminal 2200 moves to an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 2205 may further include a fingerprint sensor, a pressure sensor, an iris sensor, a molecular sensor, a gyroscope, a barometer, a hygrometer, a thermometer, an infrared sensor, and the like. Details are not described herein again.

The display unit 2206 is configured to display information entered by a user or information provided for the user. The display unit 2206 may include a display panel 22061, and the display panel 22061 may be configured in the form of a liquid crystal display (LCD), an organic light-emitting diode (OLED) and the like.

The user input unit 2207 may be configured to receive inputted digit or character information and generate key signal input related to user setting and function control of the terminal. Optionally, the user input unit 2207 includes a touch panel 22071 and another input device 22072. The touch panel 22071, also known as a touch screen, can collect a touch operation performed by a user on or near the touch panel (for example, an operation performed by the user on the touch panel 22071 or near the touch panel 22071 with any suitable object or accessory such as a finger or a stylus). The touch panel 22071 may include two parts: a touch detection apparatus and a touch controller. The touch detection apparatus detects a touch location of the user, detects a signal carried by a touch operation, and transmits the signal to the touch controller. The touch controller receives touch information from the touch detection apparatus, converts the touch information to point coordinates, and sends the point coordinates to the processor 2210, and receives and executes a command sent by the processor 2210. In addition, the touch panel 22071 may be implemented in various types such as resistive, capacitive, infrared, and surface acoustic wave. In addition to the touch panel 22071, the user input unit 2207 may further include another input device 22072. Optionally, the another input device 22072 may include, but is not limited to, a physical keyboard, function keys (such as a volume control key and a switch key), a trackball, a mouse, and a joystick. Details are not described herein.

Further, the touch panel 22071 may cover the display panel 22061. When detecting the touch operation on or near the touch panel 22071, the touch panel 22071 transmits the touch operation to the processor 2210 to determine a type of a touch event, and then the processor 2210 provides corresponding visual output on the display panel 22061 based on the type of the touch event. In FIG. 22, the touch panel 22071 and the display panel 22061 are used as two independent components to implement input and output functions of the terminal. However, in some embodiments, the touch panel 22071 and the display panel 22061 may be integrated to implement the input and output functions of the terminal. This is not specifically limited herein.

The interface unit 2208 is an interface connecting an external apparatus to the terminal 2200. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 2208 can be configured to receive an input (for example, data information and power) from the external apparatus and transmit the received input to one or more elements in the terminal 2200, or transmit data between the terminal 2200 and the external apparatus.

The memory 2209 may be configured to store a software program and various data. The memory 2209 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 2209 may include a high-speed random access memory, and may further include a non-volatile memory, for example, at least one magnetic disk storage device, a flash memory device, or another volatile solid-state storage device.

The processor 2210 is a control center of the terminal, and connects all parts of the entire terminal by using various interfaces and lines. By running or executing a software program and/or a module stored in the memory 2209 and invoking data stored in the memory 2209, the processor performs various functions of the terminal and data processing, to perform overall monitoring on the terminal. The processor 2210 may include one or more processing units. Optionally, the processor 2210 may integrate an application processor and a modem processor. The application processor mainly processes an operating system, a user interface, an application program, and the like. The modem processor mainly processes wireless communication. It can be understood that alternatively, the modem processor may not be integrated into the processor 2210.

The terminal 2200 may further include a power supply 2211 (such as a battery) that supplies power to each component. Optionally, the power supply 2211 may be logically connected to the processor 2210 by using a power management system, to implement functions such as charging, discharging, and power consumption management by using the power management system.

In addition, the terminal 2200 includes some functional modules not shown. Details are not described herein.

Optionally, an embodiment of the present disclosure further provides a terminal, including a processor 2210, a memory 2209, and a computer program stored in the memory 2209 and executable on the processor 2210. When the computer program is executed by the processor 2210, each process of the embodiments of the foregoing SRS resource configuration method can be implemented, and a same technical effect can be achieved. To avoid repetition, details are not described herein again.

An embodiment of the present disclosure further provides a computer-readable storage medium. The computer-readable storage medium stores a computer program. When the computer program is executed by the processor, each process of the embodiments of the SRS resource configuration method and the BWP switching processing method on a network device side provided in the embodiments of the present disclosure is implemented. Alternatively, when the computer program is executed by the processor, each process of the embodiments of the SRS resource configuration method on a terminal side provided in the embodiments of the present disclosure is implemented. Alternatively, when the computer program is executed by the processor, each process of the embodiments of the BWP switching processing method on a location server side provided in the embodiments of the present disclosure is implemented. The same technical effects can be achieved. To avoid repetition, details are not described herein again. The computer-readable storage medium is, for example, a read-only memory (ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a" does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a base station, or the like) to perform the method described in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether these functions are performed in a hardware mode or a software mode depends on a specific application and design constraints of the technical solution. A person skilled in the art may use different methods to achieve the described functions for each particular application, but it should not be considered that the implementation goes beyond the scope of the present disclosure.

A person skilled in the art may clearly understand that, for a convenient and simple description, the specific working processes of the system, device and unit described above may refer to a corresponding process in the foregoing method embodiments, and details are not described herein again.

In the embodiments of the application, it should be understood that the disclosed device and method may be implemented through other manners. For example, the embodiment of the device described above is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for enabling a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The foregoing storage medium may include: a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, modules, units, and subunits may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes can be stored in the memory and executed by the processor. The memory may be implemented in the processor or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A sounding reference signal (SRS) resource configuration method, comprising:
   receiving, by a terminal, first configuration information sent by a network device, wherein the first configuration information is used to configure a pattern of an SRS resource, the SRS resource is distributed at equal intervals in frequency domain, an interval is M subcarriers, and M is an integer greater than 4;
   wherein the first configuration information is further used to configure a cyclic shift value of the SRS resource;
   wherein a comb structure corresponding to M subcarriers distributed at equal intervals in frequency domain is comb-M, and M is 6, 8, or 12;
   in a case that the first configuration information satisfies a first preset condition, the terminal performs a preset operation; and in a case that the first configuration information does not satisfy the first preset condition, the terminal sends the SRS resource;
wherein the first preset condition comprises any one of the following:
M=6, the bandwidth information of the SRS resource is 8 Resource Blocks (RBs), 16 RBs, or 32 RBs; and
M=12, the bandwidth information of the SRS resource is 4 RBs, 8 RBs, 16 RBs, 20 RBs, 28 RBs, or 32 RBs;
wherein the preset operation comprises:
skipping sending the SRS resource; or
truncating a generated sequence of the SRS resource and sending a truncated sequence.

2. The method according to claim 1, wherein when M is 8, the pattern of the SRS resource comprises two consecutive resource blocks RBs; or,
wherein the first RB is any odd-numbered RB or even-numbered RB in the SRS resource.

3. The method according to claim 2, wherein the first configuration information is further used to configure a frequency domain shift of a comb structure of the SRS resource, that is, a comb offset, and the comb offset is used to indicate the lowest resource element (RE) location of the last symbol of the SRS resource in a first RB; or, wherein the first configuration information is further used to configure a comb offset of the SRS resource, and the comb offset is used to indicate the lowest RE location of the last symbol of the SRS resource in an RB.

4. The method according to claim 1, wherein the SRS resource occupies N consecutive symbols; wherein
when M=6, N is 1, 2, 4, 6, or an integer greater than 6;
when M=8, N is 1, 2, 4, 8, or an integer greater than 8; and
when M=12, N is 1, 2, 4, 6, 8, 12, or an integer greater than 12.

5. The method according to claim 1, wherein the consecutive N symbols occupied by the SRS resource are the first N symbols, or the last N symbols, or N symbols at any middle locations in a slot.

6. The method according to claim 1, wherein
when M=6, the cyclic shift value is a natural number less than 8;
when M=8, the cyclic shift value is a natural number less than 6; and
when M=12, the cyclic shift value is a natural number less than 4.

7. The method according to claim 1, wherein the first configuration information is further used to configure a repetition factor of the SRS resource;
when M=6, the repetition factor is 1, 2, 4, or 6;
when M=8, the repetition factor is 1, 2, 4, or 8; and
when M=12, the repetition factor is 1, 2, 4, 6, or 12; or,
wherein the first configuration information is further used to configure an RE shift between adjacent symbols of the SRS resource;
when M=6, the RE shift is 1, 2, or 3;
when M=8, the RE shift is 1, 2, or 4; and
when M=12, the RE shift is 1, 2, 3, 4, or 6.

8. The method according to claim 1, wherein the SRS resource is used for positioning.

9. The method according to claim 1, wherein when a number N of symbols occupied by the SRS resource is greater than M, a frequency domain location of the $(M+Y)^{th}$ symbol from the last of the SRS resource is the same as a frequency domain location of the $Y^{th}$ symbol from the last, M+Y is less than or equal to N, and Y is a positive integer.

10. The method according to claim 1, further comprising:
receiving first indication information sent by the network device, wherein the first indication information is used to indicate bandwidth information of the SRS resource.

11. The method according to claim 1, wherein the first configuration information is not associated with an uplink bandwidth part (UL BWP) configuration.

12. A network device, comprising: a memory, a processor, and a program stored in the memory and executable on the processor, wherein when the program is executed by the processor, steps of the sounding reference signal (SRS) resource configuration method, wherein the method comprises: sending first configuration information to a terminal, wherein the first configuration information is used to configure a pattern of a sounding reference signal SRS resource, the SRS resource is distributed at equal intervals in frequency domain, an interval is M subcarriers, and M is an integer greater than 4;
wherein a comb structure corresponding to M subcarriers distributed at equal intervals in frequency domain is comb-M, and M is 6, 8, or 12,
wherein the first configuration information is further used to configure a cyclic shift value of the SRS resource,
wherein in a case that the first configuration information satisfies a first preset condition, the first configuration information is further used to instruct the terminal to perform a preset operation;
wherein the first preset condition comprises any one of the following:
M=6, the bandwidth information of the SRS resource is 8 Resource Blocks (RBs), 16 RBs, or 32 RBs; and
M=12, the bandwidth information of the SRS resource is 4 RBs, 8 RBs, 16 RBs, 20 RBs, 28 RBs, or 32 RBs,
wherein the preset operation comprises:
skipping sending the SRS resource; or
truncating a generated sequence of the SRS resource and sending a truncated sequence.

13. The network device according to claim 12, wherein
when M=6, the cyclic shift value is a natural number less than 8;
when M=8, the cyclic shift value is a natural number less than 6; and
when M=12, the cyclic shift value is a natural number less than 4; or,
wherein the first configuration information is further used to configure a repetition factor of the SRS resource;
when M=6, the repetition factor is 1, 2, 4, or 6;
when M=8, the repetition factor is 1, 2, 4, or 8; and
when M=12, the repetition factor is 1, 2, 4, 6, or 12; or,
wherein the first configuration information is further used to configure an RE shift between adjacent symbols of the SRS resource;
when M=6, the RE shift is 1, 2, or 3;
when M=8, the RE shift is 1, 2, or 4; and
when M=12, the RE shift is 1, 2, 3, 4, or 6.

14. A terminal, comprising: a memory, a processor, and a program stored in the memory and executable on the processor, wherein when the program is executed by the processor, steps of the sounding reference signal (SRS) resource configuration method wherein the method comprises:
receiving, by a terminal, first configuration information sent by a network device, wherein the first configuration information is used to configure a pattern of an SRS resource, the SRS resource is distributed at equal intervals in frequency domain, an interval is M subcarriers, and M is an integer greater than 4;

wherein the first configuration information is further used to configure a cyclic shift value of the SRS resource;

wherein a comb structure corresponding to M subcarriers distributed at equal intervals in frequency domain is comb-M, and M is 6, 8, or 12;

in a case that the first configuration information satisfies a first preset condition, the terminal performs a preset operation; and in a case that the first configuration information does not satisfy the first preset condition, the terminal sends the SRS resource;

wherein the first preset condition comprises any one of the following:

M=6, the bandwidth information of the SRS resource is 8 Resource Blocks (RBs), 16 RBs, or 32 RBs; and M=12, the bandwidth information of the SRS resource is 4 RBs, 8 RBs, 16 RBs, 20 RBs, 28 RBs, or 32 RBs;

wherein the preset operation comprises:

skipping sending the SRS resource; or truncating a generated sequence of the SRS resource and sending a truncated sequence.

15. The terminal according to claim 14, wherein when M=6, the cyclic shift value is a natural number less than 8;

when M=8, the cyclic shift value is a natural number less than 6; and when M=12, the cyclic shift value is a natural number less than 4; or, wherein the first configuration information is further used to configure a repetition factor of the SRS resource;

when M=6, the repetition factor is 1, 2, 4, or 6;

when M=8, the repetition factor is 1, 2, 4, or 8; and when M=12, the repetition factor is 1, 2, 4, 6, or 12; or, wherein the first configuration information is further used to configure an RE shift between adjacent symbols of the SRS resource;

when M=6, the RE shift is 1, 2, or 3;

when M=8, the RE shift is 1, 2, or 4; and when M=12, the RE shift is 1, 2, 3, 4, or 6.

16. The terminal according to claim 14, wherein when M is 8, the pattern of the SRS resource comprises two consecutive resource blocks (RBs); or, wherein the first RB is any odd-numbered RB or even-numbered RB in the SRS resource.

17. The terminal according to claim 16, wherein the first configuration information is further used to configure a frequency domain shift of a comb structure of the SRS resource, that is, a comb offset, and the comb offset is used to indicate the lowest resource element (RE) location of the last symbol of the SRS resource in a first RB; or, wherein the first configuration information is further used to configure a comb offset of the SRS resource, and the comb offset is used to indicate the lowest RE location of the last symbol of the SRS resource in an RB.

18. The terminal according to claim 14, wherein the SRS resource occupies N consecutive symbols; wherein when M=6, N is 1, 2, 4, 6, or an integer greater than 6;

when M=8, N is 1, 2, 4, 8, or an integer greater than 8; and when M=12, N is 1, 2, 4, 6, 8, 12, or an integer greater than 12.

19. The terminal according to claim 14, wherein the consecutive N symbols occupied by the SRS resource are the first N symbols, or the last N symbols, or N symbols at any middle locations in a slot.

20. The terminal according to claim 14, wherein the SRS resource is used for positioning.

* * * * *